United States Patent [19]
Miliani

[11] Patent Number: 5,488,659
[45] Date of Patent: Jan. 30, 1996

[54] ENCRYPTION/DECRYPTION PROCESS AND APPARATUS FOR A MULTICHANNEL TELEVISION SYSTEM

[75] Inventor: Pablo Miliani, Westlake Village, Calif.

[73] Assignee: California Amplifier, Camarillo, Calif.

[21] Appl. No.: 331,054

[22] Filed: Oct. 28, 1994

Related U.S. Application Data

[63] Continuation-in-part of Ser. No. 89,941, Jul. 12, 1993, abandoned.

[51] Int. Cl.$^6$ .................................................. H04N 7/171
[52] U.S. Cl. ................................. 380/15; 380/10; 380/20
[58] Field of Search ................................. 380/10, 15, 20

[56] References Cited

U.S. PATENT DOCUMENTS 5,125,100  6/1992  Katznelson .................................. 455/6.1
5,319,709  6/1994  Raiser et al. ................................. 380/15

Primary Examiner—Gilberto Barrón, Jr.
Attorney, Agent, or Firm—Freilich Hornbaker Rosen

[57] ABSTRACT

An encryption/decryption system which facilitates simultaneous decryption of multiple encrypted television signals thus making them simultaneously available for direct tuning in television receivers. The system is characterized by the utilization of a plurality of channel signals each containing picture portions and synchronization portions respectively corresponding to the picture components and synchronization components of a different video signal. Corresponding portions of all channel signals are time synchronized with respect to a common timing reference signal. Each channel signal is encrypted in accordance with a predetermined encoding rule and distributed to subscriber sites where the channel signals are made simultaneously available for viewing by decrypting them synchronously with the recovered timing reference signal in accordance with the inverse of the encoding rule.

32 Claims, 20 Drawing Sheets

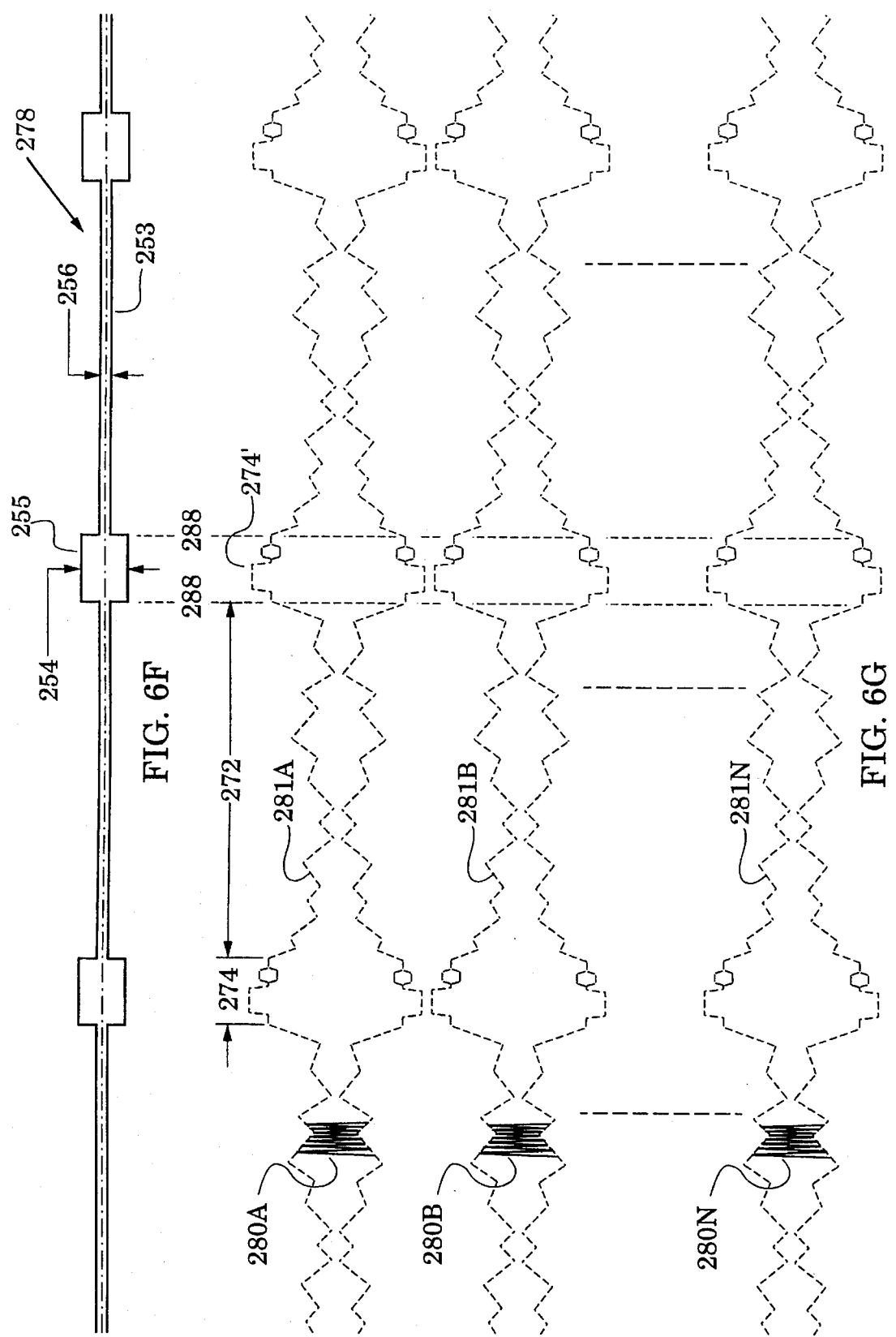

ENCRYPTION/DECRYPTION PROCESS AND APPARATUS FOR A MULTICHANNEL TELEVISION SYSTEM

This application is a continuation in part of application Ser. No. 08/089,941, filed Jul. 12, 1993 abandoned.

BACKGROUND OF THE INVENTION

The present invention relates generally to multichannel television systems and more particularly to an encryption/decryption subsystem particularly suited for use in subscription television distribution systems.

Subscription television distribution systems (either (1) cable or (2) over-the-air) typically provide subscribers a basic block of television channels for a basic monthly fee and one or more premium channels for an additional fee. In a typical cable system, the physical connection itself controls access to the basic channels while the premium channels are often "scrambled" (encrypted) to restrict their viewing to only subscribers who pay the additional fee.

In over-the-air systems (often called "wireless TV"), all channels are generally scrambled to prevent unauthorized reception of both basic and premium channels since the transmitted signals are available to anyone in the geographical service area. Subscribers are typically provided with a descrambler which can descramble one channel at a time. Therefore, subscriber receivers, e.g., television sets, videocassette recorders, can only be tuned to a single selected channel and features of modern television equipment that process multiple channels, e.g., "picture-in-picture", are useless.

A commonly used television encryption/scrambling method, known as "sync suppression" involves the suppression or removal of horizontal and/or vertical synchronization pulses so that a receiver is unable to properly synchronize the picture display. The subscriber's decrypter/descrambler restores, in a selected channel, the suppressed or omitted synchronization components of the received video signal so that the picture information can be properly displayed.

Sync suppression systems include both (1) baseband sync suppression and (2) RF sync suppression. In baseband systems, the signal is descrambled in baseband video after demodulation of the selected RF channel. In RF systems, descrambling is performed prior to demodulation.

U.S. Patents directed to television encryption/decryption methods and apparatus include U.S. Pat. Nos. 4,466,017; 4,503,462; 4,590,419; 4,594,609; 4,598,313; 4,602,284; 4,706,283; 4,802,214; 4,815,129; 4,817,144; 4,864,613; 4,926,477; 4,928,309; 5,058,160; and 5,093,921.

SUMMARY OF THE INVENTION

The present invention is directed to an encryption/decryption process which facilitates simultaneous decryption of multichannel encrypted television signals thus making them simultaneously available for direct tuning in television receivers. The invention can be advantageously used in subscription television distribution systems to provide subscribers with a plurality of simultaneously available television signals.

A system in accordance with the invention is characterized by the utilization of a plurality of channel signals each containing picture portions and synchronization portions respectively corresponding to the picture components and synchronization components of a different video signal. In accordance with a significant feature of the invention, corresponding portions of all channel signals are time synchronized with respect to a common timing reference signal. Each channel signal is encrypted in accordance with a predetermined encoding rule and distributed to subscriber sites where, in accordance with another significant feature of the invention, the channel signals are made simultaneously available for viewing by decrypting them synchronously with the recovered timing reference signal and in accordance with the inverse of the selected encoding rule.

In a preferred embodiment, received intermediate frequency channel signals are simultaneously decoded by passing them through a single downconverter/decoder, e.g., a variable gain amplifier whose gain is varied in accordance with the inverse of the selected encoding rule.

In another preferred embodiment, the intermediate frequency channel signals are upconverted to RF frequency channel signals for transmission to a subscriber site as a common RF signal where they are simultaneously downconverted and decoded by shaping their amplitude in accordance with the inverse of the selected encoding rule.

In accordance with an aspect of a preferred embodiment, authorization data is combined with the common timing reference signal before and modulated onto a selected channel signal before distribution to the subscriber sites. In accordance with a further aspect of a preferred embodiment, the modulation apparatus uses a frequency modulation technique that does not alter the difference between audio and video carrier frequencies.

The novel features of the invention are set forth with particularity in the appended claims. The invention will be best understood from the following description when read in conjunction with the accompanying drawings.

BRIEF DESCRIPTION OF THE DRAWINGS

FIG. 6F illustrates a decoding rule which is the inverse of the encoding rule of FIG. 6C;

FIG. 6G illustrates the video IF carriers of FIG. 6E after modification in accordance with the decoding rule of FIG. 6F;

DESCRIPTION OF THE PREFERRED EMBODIMENTS

Figure 1B:
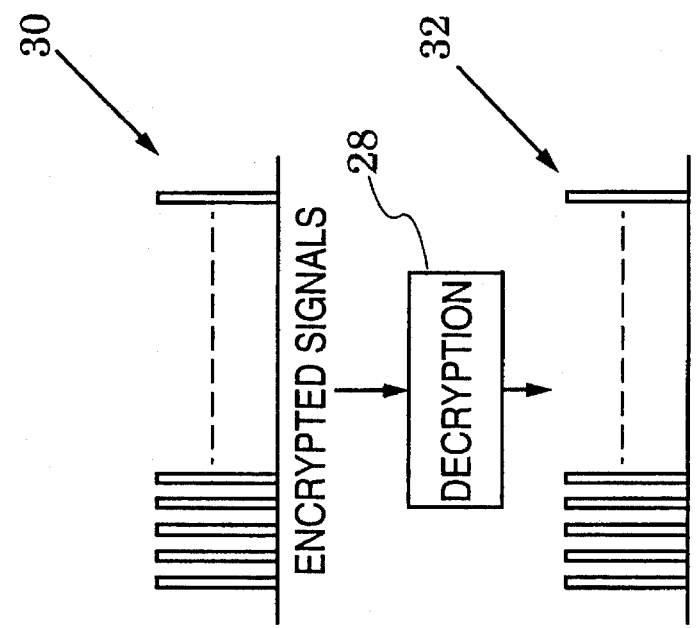
FIG. 1B illustrates that decryption provides simultaneous access to all encrypted signals in a subscription television distribution system in accordance with the present invention.
Figure 1A:
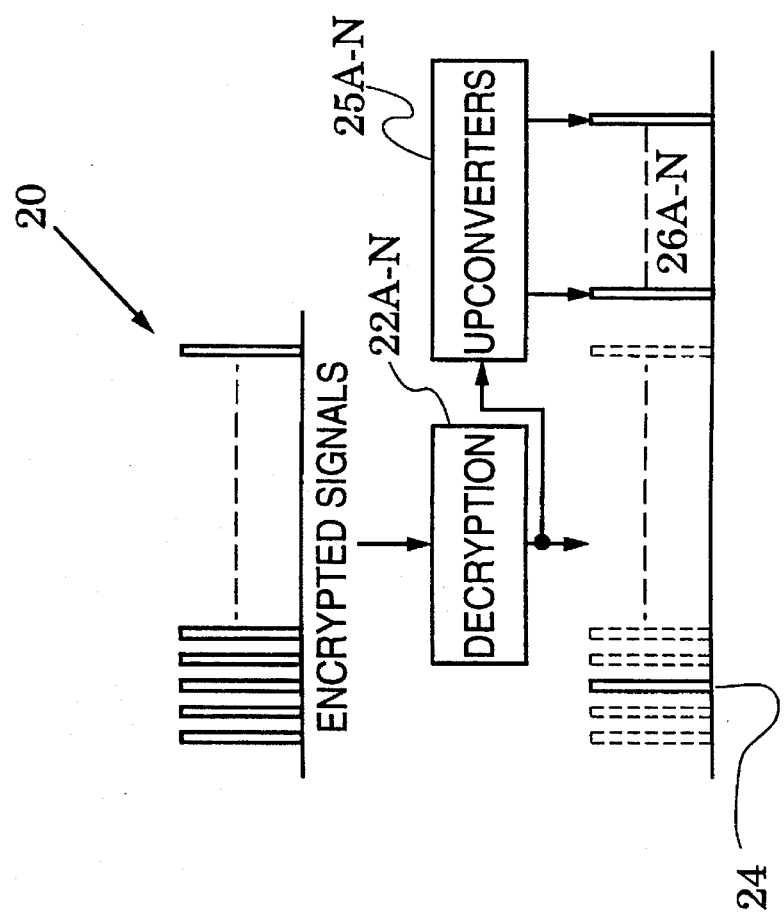
FIG. 1A illustrates that decryption is typically restricted to a single selected signal in prior art subscription television distribution systems.

As shown in FIG. 1A, typical prior art television distribution systems provide subscribers with a plurality of encrypted television signals 20 but restrict decryption 22 to the production of one decrypted signal 24 at a time. Thus, for example, a subscriber can cause any one of the encrypted signals 20 to be decrypted for viewing on a television set but cannot, at the same time record another decrypted signal on a video cassette recorder or use another signal for a "picture-in-picture" system. In an attempt to address this limitation, one prior art system uses a plurality of decoders, e.g., 22A–22N, one for each encrypted channel, that respectively decode the signals which are then upconverted by a plurality of upconverters 25A–25N to a new channel frequency 26A–26N.

FIG. 1B illustrates that encryption/decryption systems taught by the present invention facilitate decryption 28 of all encrypted signals 30 simultaneously so that a complete set of decrypted signals 32 is simultaneously available in their original frequency slots. Therefore, a subscriber can have each of a plurality of television receivers (e.g., television sets, video cassette recorders) receiving a different signal simultaneously while also using modern television processing features, e.g., picture-in-picture, which require simultaneous availability of multiple channels.

Figure 2:
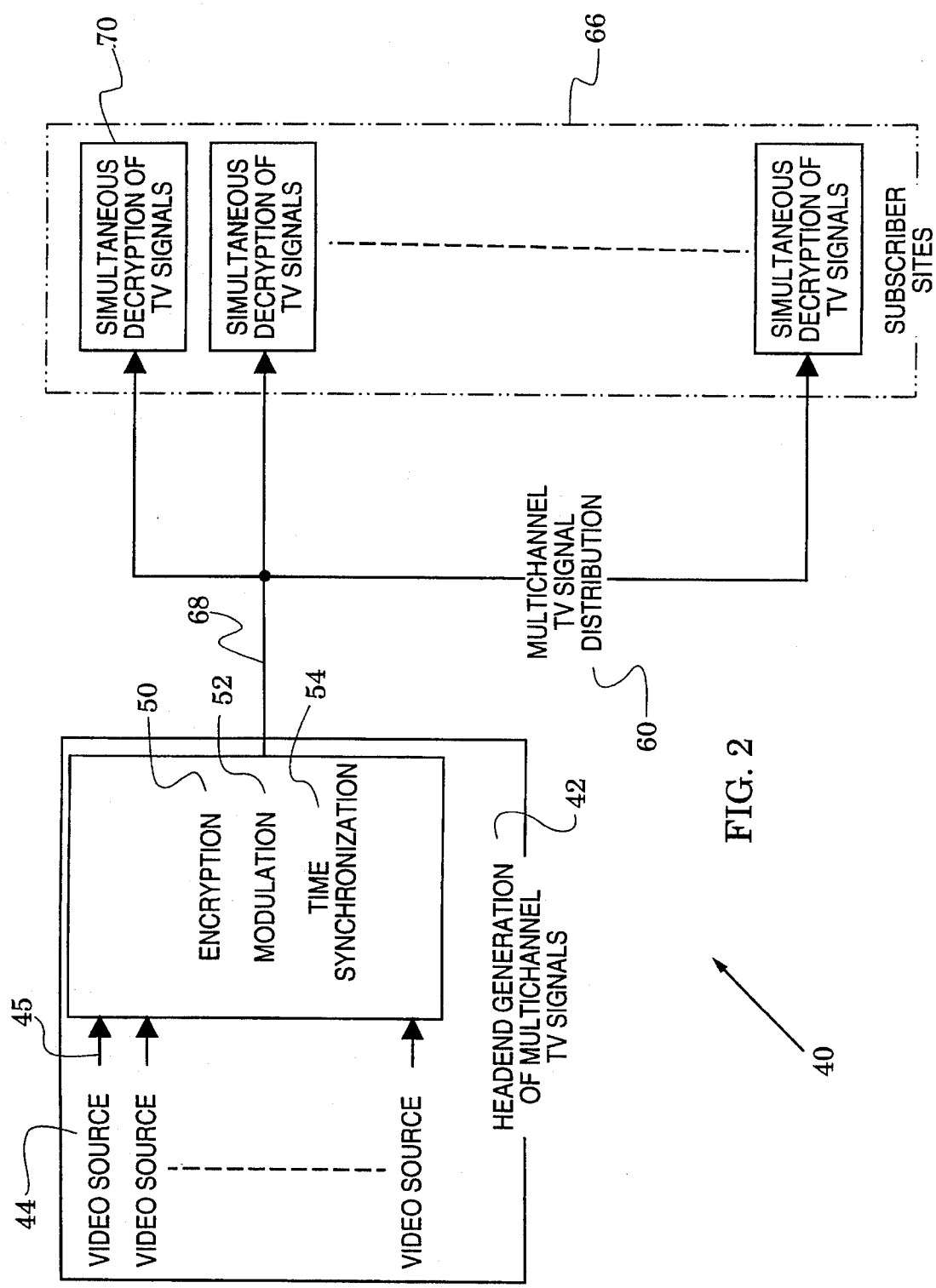
FIG. 2 illustrates encryption/decryption processes in accordance with the present invention.
Figure 5:
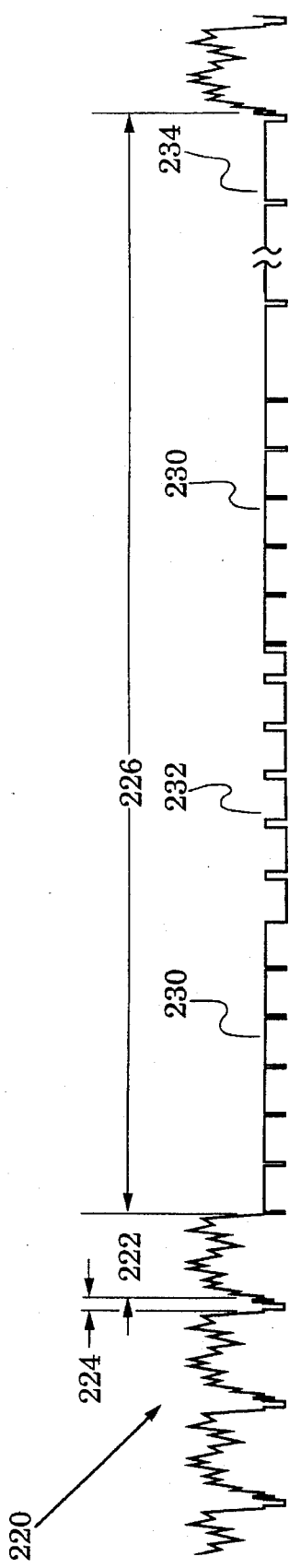
FIG. 5 illustrates a typical composite video signal.

An encryption/decryption process 40, in accordance with the invention, is shown in FIG. 2. Television distribution systems typically include a "headend" where a plurality of television signals from different sources, e.g., satellite TV signals, standard broadcast VHF and UHF signals, are captured, combined and fed into the system. In the process 40, headend generation 42 of multichannel TV signals begins with a plurality of video sources 44 which each provide a composite video signal 45 including picture and synchronization components (as shown in FIG. 5 and further described below).

The composite video signals 45 are encrypted 50 and used to modulate 52 separate channels to place them into separate frequency channels for distribution. In addition, a process of time synchronization 54 is imposed to place like components of the composite video signals 45 in a predetermined time relationship.

Distribution 60 to subscriber sites 66 of the signals generated at the headend may then be accomplished by a variety of well known processes, e.g., cable transmission or wireless over-the-air transmission, as a common RF signal 68 that contains each composite video signal in a distinct frequency slot. Because of the time synchronization 54 imposed at the headend, the common RF signal 68, comprised of a plurality of TV signals separated in frequency, arrive at the subscriber sites 66 in time synchronization so that decryption 70 can be performed on all signals simultaneously.

Figure 3A:
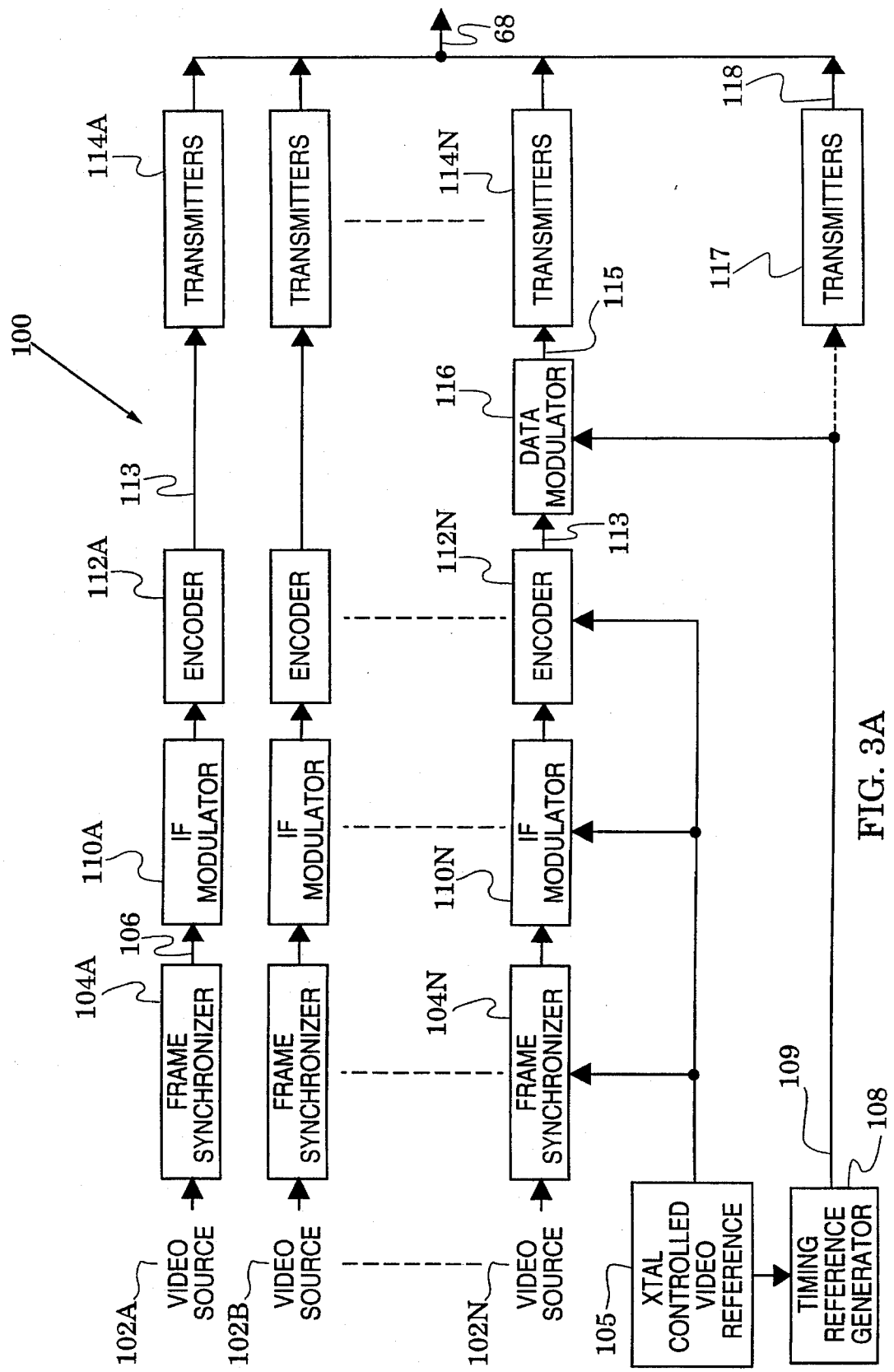
FIGS. 3A and 3B are block diagrams of alternative embodiments of an encryption system configured to facilitate the simultaneous decryption of all encrypted signals.
Figure 3B:
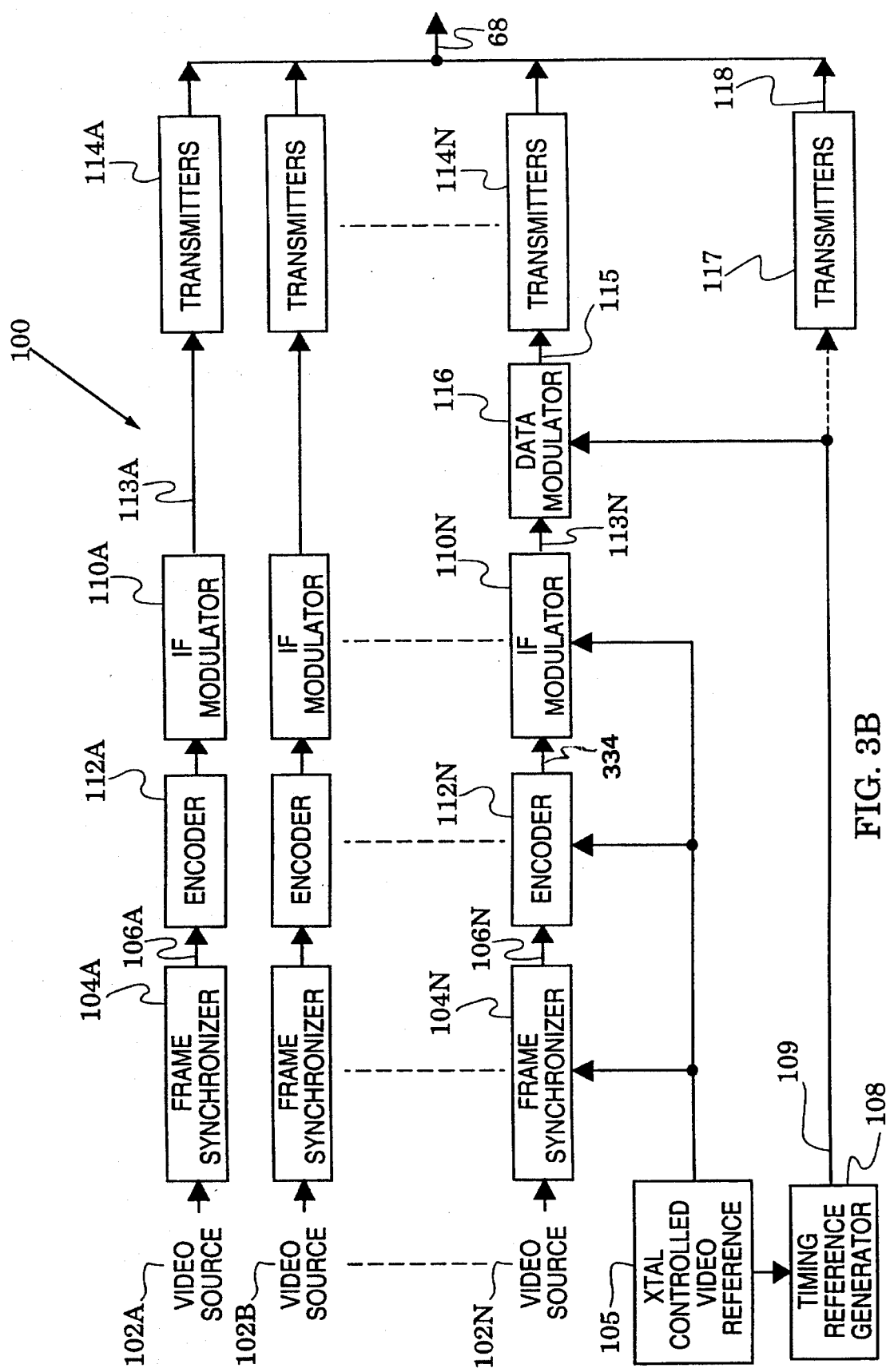
Figure 4:
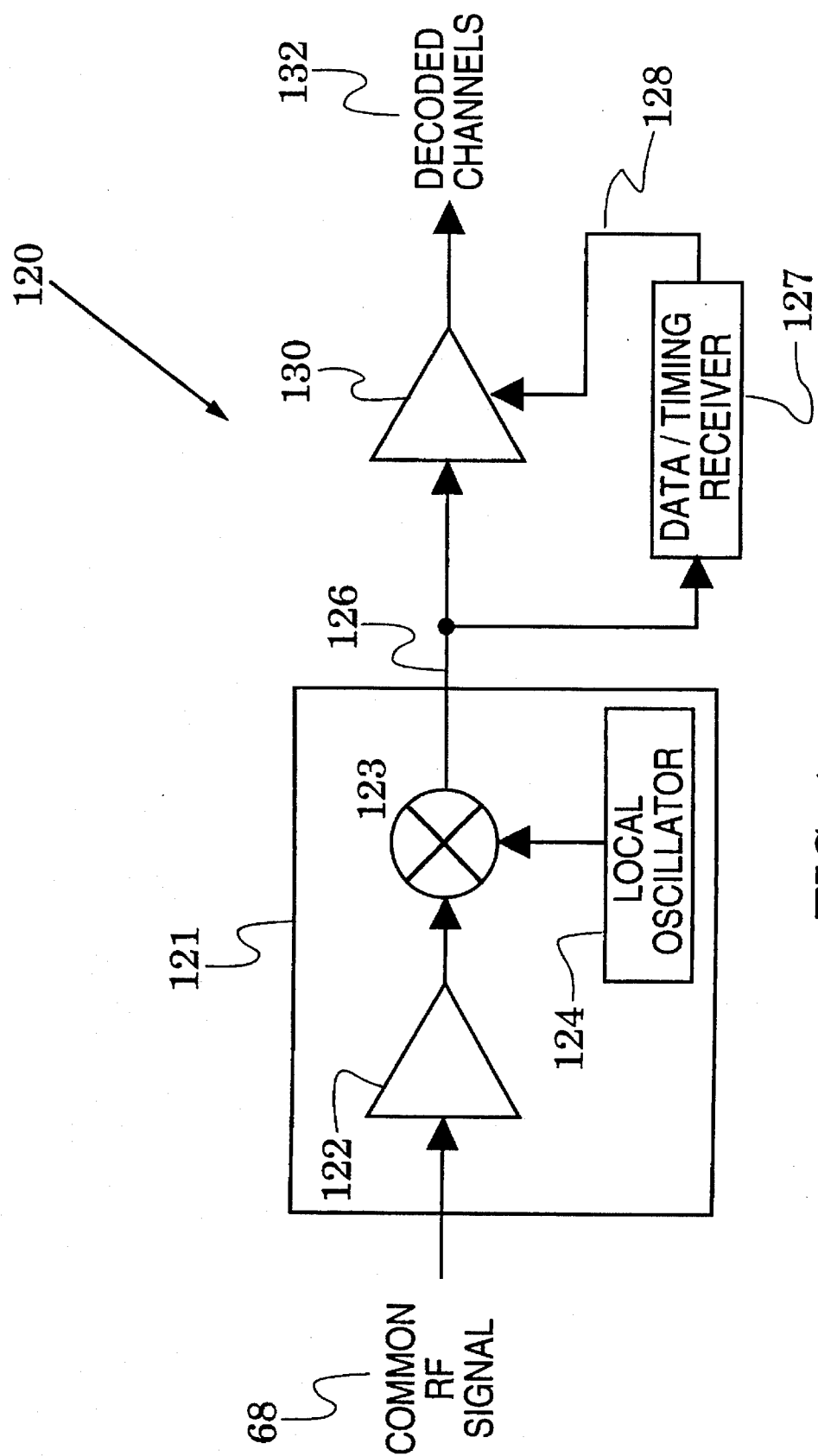
FIG. 4 is a block diagram of apparatus for simultaneous decryption of signals generated by the systems of FIGS. 3A and 3B.

Apparatus embodiments for realizing the processes of FIG. 2 are illustrated in FIGS. 3A, 3B and 4. FIG. 3A shows a block diagram of a headend 100 in which baseband composite video sources 102A–102N are each connected to separate electronic delay devices such as frame synchronizers 104. The frame synchronizers 104 selectively delay the composite video signals from the sources 102A–102N to place like components, e.g., picture and synchronization components, in time synchronization with reference to a crystal controlled video reference 105, thus generating time synchronized composite video signals 106. The crystal controlled video reference 105 is coupled to a timing reference generator 108 used to synchronously generate a common timing reference signal 109, as described further below.

The time synchronized composite video signals 106 are used to amplitude modulate separate video IF carriers in IF modulators 110 after which encryption is accomplished by modifying IF envelopes in accordance with a selected encoding rule (code) in encoders 112, thus generating encoded IF carriers 113. Typical apparatus for envelope modification include variable gain amplifiers, variable loss attenuators and selectable signal paths having different gains. Exemplary envelope modification apparatus are disclosed in U.S. Pat. Nos. 4,706,283; 4,802,214; 4,926,477; and 4,928,309, the disclosures of which are hereby incorporated by reference.

The modulators 110 and encoders 112 of FIG. 3A may alternatively be interchanged, as shown in FIG. 3B, to use the encoder 112 to first encode the time synchronized video signals 106 by amplitude modification in accordance with a selected encoding rule and then using the resultant signal to amplitude modulate an IF carrier with the IF modulator 110. Video amplitudes may be modified with apparatus similar to the above mentioned examples. Specific apparatus for video baseband envelope modification is disclosed in U.S. Pat. No. 4,928,309, the disclosure of which is hereby incorporated by reference.

The encoded IF carriers 113 are preferably upconverted from a standard IF frequency and frequency multiplexed in standard TV transmitters 114 for distribution to subscriber sites as the common RF signal 68. The RF frequency slots are typically specified in accordance with industry standards. For example, a typical Multichannel Multipoint Distribution Service (MMDS) includes 33 channel slots within a transmission frequency range of 2500–2686 MHz and 2150–2162 MHz.

The timing reference generator 108 generates the common timing reference signal 109 which is transmitted with the synchronized video signals to provide master timing information for decoding synchronization. This signal is preferably combined with a selected encoded IF carrier 113 to form a data modulated IF carrier 115, by a data modulator 116. The data modulator 116 is placed in a selected channel at the headend but it may alternatively be inserted (indicated by broken line) into a transmitter 117 to be carried by an otherwise unused RF channel 118. The data modulator 116 may alternatively be present on more than one of the video channels prior to the transmitters 114 and selectively enabled at the headend. Authorization data status (described further below) is also preferably combined with the common timing reference signal 109 and transmitted to selectively enable or disable decoding at each subscriber site.

FIG. 4 illustrates a block diagram of a downconverter/decoder 120 suitable for simultaneous decryption at subscriber sites of the common RF signal 68 received from the headend 100 of FIGS. 3A and 3B. In the block diagram of FIG. 4, downconversion electronics 121 are shown essentially comprised of an input RF amplifier 122, a mixer 123 and a local oscillator 124. The input RF amplifier 122 amplifies and buffers the common RF signal 68 that was alternatively broadcast or distributed via cable from the transmitters 114 of FIGS. 3A and 3B. The amplifier 122 feeds a buffered common RF signal 126 to the mixer 123 which downconverts the buffered common RF signal 126 using the local oscillator 124, generating a downconverted common RF signal 126. In a preferred embodiment, the common RF signal 68 is received via a microwave antenna (not shown) and subsequently downconverted via the downconversion electronics 121 as disclosed in a commonly assigned, copending application to Joel J. Raymond et al., Ser. No. 08/131,081, which is incorporated herein by reference.

From the downconverted common RF signal 126, the common timing reference signal (109 in FIGS. 3A and 3B) is recovered in a data/timing receiver 127. This receiver 127 also stores a decoding rule which is the inverse of the selected encoding rule used in the encoders 112 of FIGS. 3A and 3B. Specific structure in the receiver 127 for recovery of the common timing reference signal 109 is primarily dependent upon the type of timing signal selected. Exemplary recovery structures are disclosed in U.S. Pat. Nos. 4,706,283; 4,802,214; 4,926,477; and 4,928,309, previously referred to above and incorporated herein.

With the common timing reference signal and the decoding rule available (and preferably after confirmation of the authorization data), the data/timing receiver 127 can apply gain control signals 128 to a variable gain amplifier/attenuator 130 which simultaneously modifies the IF carrier envelopes with signal 126 in accordance with the decoding rule to generate decoded channel signals 132. In a preferred embodiment, the variable gain amplifier/attenuator 130 is a single element that operates on a single signal derived from the common RF signal 68. It is this ability to operate upon all television signals by a single element that is referred to in this application as "simultaneous". While a preferred embodiment uses a single variable gain amplifier/attenuator 130, other embodiments may use additional variable gain/amplifiers to synchronously operate upon a signal derived from the common RF signal 68 in an equivalent manner.

Thus, the decoded channels 132 are now simultaneously available and can be distributed throughout the subscriber location for use in all television apparatus without further processing. In addition, once the data/timing receiver 127 preferably confirms the authorization data, all channels will automatically be available for use, i.e., no user interaction, such as selecting a channel for decoding, will be involved. The downconverter/decoder 120 of FIG. 4 can be economically integrated to reduce subscriber costs.

The invention is further disclosed by a preferred process embodiment illustrated in FIGS. 6A–6G. Description of this exemplary embodiment is facilitated by reference to a typical composite television video signal 220, shown in FIG. 5, as specified by television industry standards, e.g., National Television Systems Committee (NTSC).

The signal 220 of FIG. 5 has picture components 222 alternating with horizontal synchronization components 224 and these components are periodically separated by vertical synchronization components 226 during a vertical synchronization interval. The vertical synchronization components 226 generally include equalizing pulses 230, vertical synchronization pulses 232 and horizontal synchronization pulses 234. As is well known, the horizontal synchronization components 224 and vertical synchronization components 226 enable television receivers to properly synchronize the picture display.

Figure 6A:
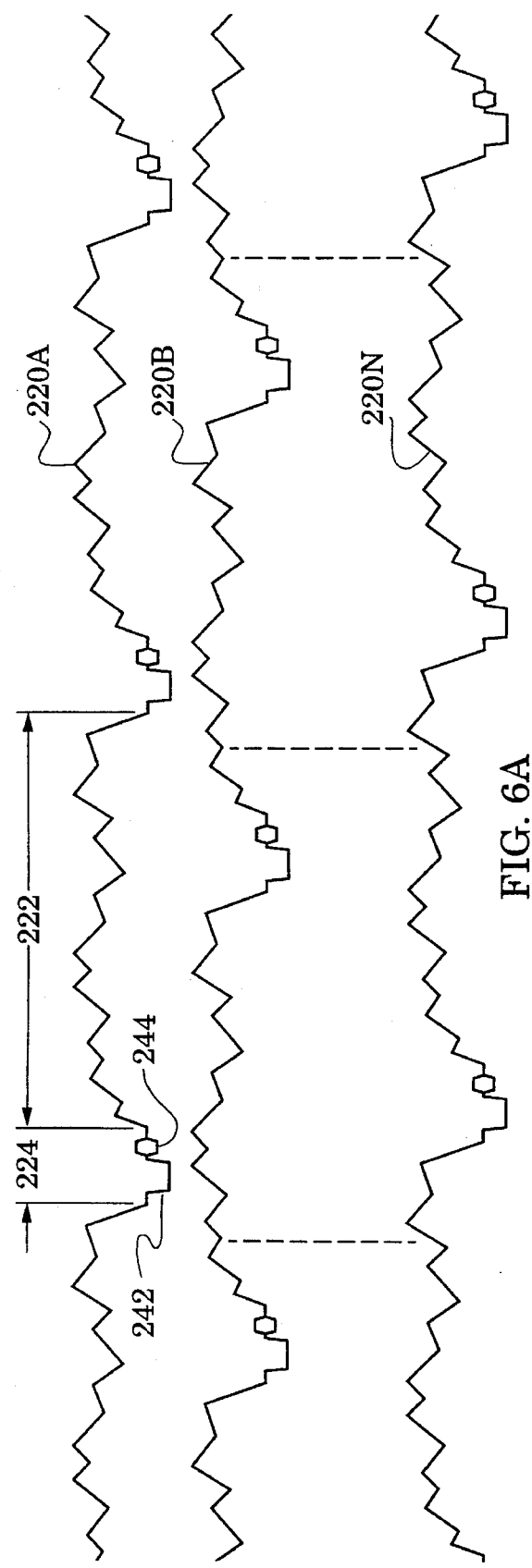
FIG. 6A is an enlarged view of the picture and horizontal synchronization components of a plurality of composite video signals.

FIG. 6A is an enlarged view of the picture components 222 and horizontal synchronization components 224 of a plurality of composite video signals 220A–220N. Each horizontal synchronization component 224 is seen to include a horizontal synchronization pulse 242 and, as in the case of color television, a color burst sine wave 244 (indicated by the sine wave envelope).

Figure 6B:
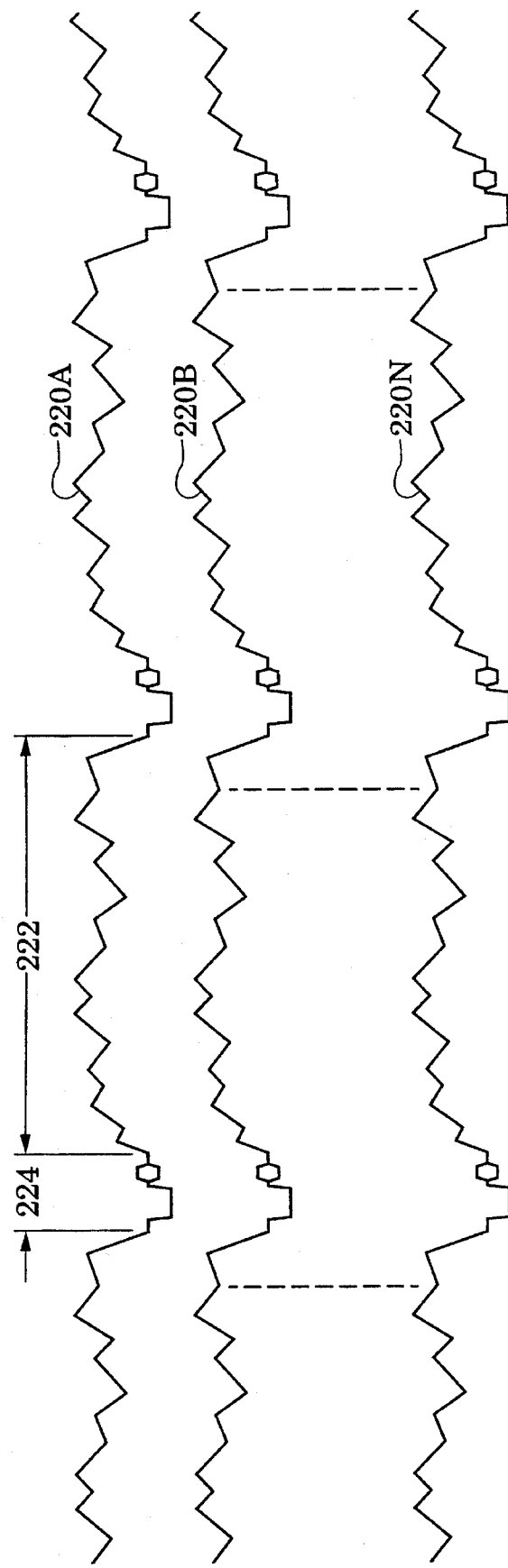
FIG. 6B illustrates the composite video signals of FIG. 6A with like components in time coincidence.

In this preferred method, like components of the video signals 220 are first aligned in time coincidence as shown in FIG. 6B and their amplitude then modified in accordance with a selected encoding rule. To illustrate this amplitude modification, an exemplary encoding rule, having an encoding pattern 250 of FIG. 6C, will be used.

The pattern 250 is visually indicated by two lines 251 equally vertically spaced about a centerline 252 in which the vertical spacing between lines 251 indicates gain. Thus, the pattern 250 has segments 253 with a gain 254 interleaved with segments 255 having a decreased gain 256. The encoding pattern 250 is synchronized with the composite video signals 220A–220N of FIG. 6B to have gain segments 253 and gain segments 255 time coincident respectively with picture components 222 and horizontal synchronization components 224.

The pattern 250 and the particular time synchronization described above are for illustrative purposes only; any encoding rule and time synchronization may be used that will prevent unauthorized television receivers from properly displaying the video signal.

Figure 6C:
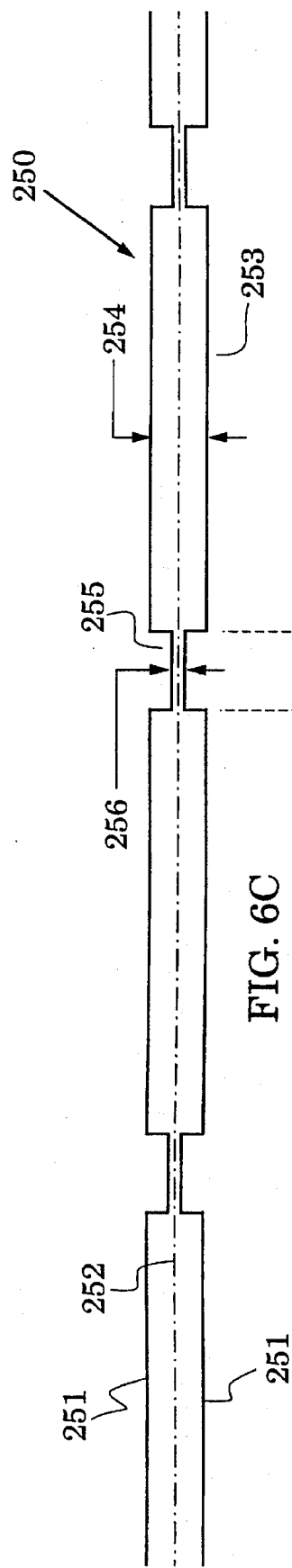
FIG. 6C illustrates an exemplary encoding rule for encoding the components of the composite video signals of FIG. 6B.
Figure 6D:
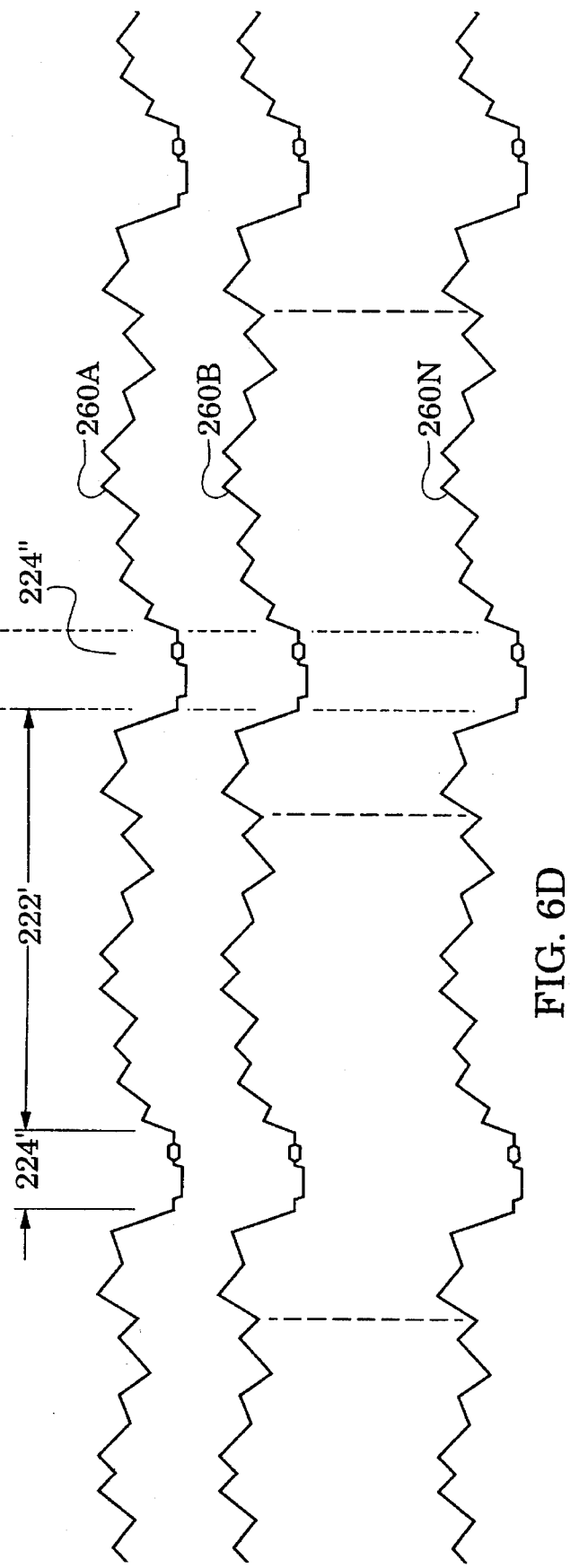
FIG. 6D illustrates a plurality of encoded composite video signals resulting from modification of the composite video signals of FIG. 6B in accordance with the encoding rule of FIG. 6C.

When the amplitudes of the video signals 220A–220N are modified in accordance with the encoding pattern 250, a plurality of encoded video signals 260A–260N is produced having picture components 222' and horizontal synchronization components 224' as shown in FIG. 6D. Synchronism between one of the gain segments 255 and a corresponding horizontal synchronization component 224" is indicated by the broken lines 266. Thus, in the encoded composite video signals 260A–260N, the horizontal synchronization components 224 are reduced relative to the other video components.

Figure 6E:
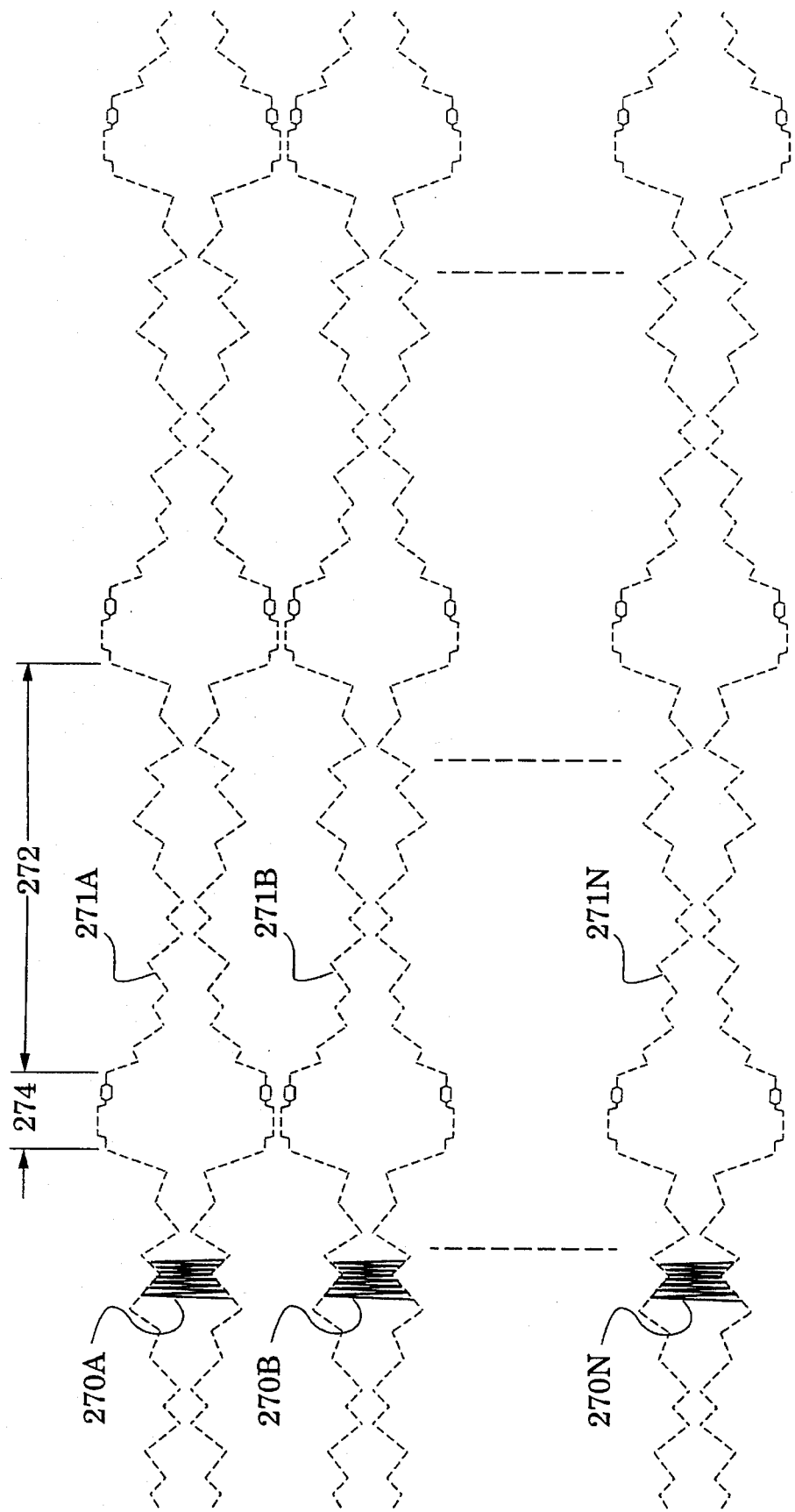
FIG. 6E illustrates a plurality of video IF carriers, each amplitude modulated with a different one of the encoded composite video signals of FIG. 6D.

In FIG. 6E, a plurality of video IF (intermediate frequency) carriers 270A–270N have each been amplitude modulated with a different one of the encoded video signals 260A–260N to have amplitude envelopes 271A–271N as shown in broken lines. The modulated video IF carriers thus have portions corresponding to the components of the encoded composite video signals 260 of FIG. 6D, e.g., picture portions 272 and horizontal synchronization portions 274 correspond respectively to picture components 222' and horizontal synchronization components 224'.

In the preferred method, upon receipt at a subscriber site, the video IF carriers 270A–270N are simultaneously shaped in accordance with the inverse of the encoding pattern 250. FIG. 6F illustrates this inverse as the decoding pattern 278 in which the gains 254, 256 have been inverted, i.e., segments 255 now have the increased gain 254 while segments 253 have the decreased gain 256.

The decoding pattern 278 is synchronized with the modulated video IF carriers 270 of FIG. 6E in the same manner as was done with the encoding pattern 250 of FIG. 6C and the composite video signals 220 of FIG. 6B, i.e., gain segments 253 and gain segments 255 are made time coincident respectively with picture portions 272 and horizontal synchronization components 274.

As shown in FIG. 6B, when the amplitudes 271A–271N of FIG. 6E are modified in accordance with the decoding pattern 278, a plurality of video IF carriers 280A–280N, with amplitude envelopes 281A–281N, are produced each having picture portions 272 and horizontal synchronization portions 274 which conform respectively with the picture components 222 and horizontal synchronization components 224 of FIG. 6B. Synchronism between one of the gain segments 255 and a corresponding horizontal synchronization portion 274' is indicated by the broken lines 288. Thus, all video IF carrier signals have been simultaneously decoded at the subscriber site without any change in frequency allocation and are simultaneously available for use.

In FIGS. 6C, 6D and FIGS. 6F, 6G, the synchronism between the inverse decoding rule 280 and video IF portions 272, 274 was specified to be the same as between the encoding rule 250 and corresponding video components 222, 224. As previously discussed, this synchronism is realized with a common timing reference signal synchronous with the encoding which is then recovered at the subscriber site for synchronizing the decoding of the encoded signals. Typical modulation methods for carrying timing reference signals on IF or RF carriers include amplitude modulation, frequency shift keying and phase shift keying. A preferred embodiment employing frequency shift keying is described further below. The common timing reference signal may preferably be inserted in synchronization components, i.e., horizontal or vertical, to avoid disturbing picture information. The common timing reference signal is preferably combined with authorization data which is coded into one or more video IF carrier signals.

In the preferred method embodiment, illustrated in FIGS. 6A–6G, generation of the video carriers with encoded amplitudes 271A–271N, as shown in FIG. 6E, followed the sequence of video signal time alignment, amplitude modification of video signals in accordance with a selected encoding rule and modulation of video IF carriers with the encoded video signals. It should be apparent, however, that other method embodiments, in accordance with the invention, may employ other equivalent sequences, e.g., the sequence previously described and shown in FIGS. 3A and 3B.

Also, the illustrated preferred method embodiment simultaneously decodes modulated IF carriers. It should be apparent to those skilled in the art that equivalent method embodiments may include transmission techniques such as the upconversion of each IF carrier to one of a plurality of RF frequency signals followed by frequency multiplexing. The resulting RF frequency signals may then be modified in accordance with the inverse of the selected encoding rule to simultaneously decode the video signals carried therein. Both IF and RF signals may be generically referred to as channel signals.

Although the encryption/decryption process shown in the preferred embodiments has been specifically directed to amplitude modification of analog video signals, the teachings of the invention may generally be extended to encryption/decryption of other forms of video signals, e.g., bit streams resulting from digitization of analog video signals. Also, although horizontal sync suppression has been shown as an encoding method, other encoding methods are also recognized within the scope of the present invention, including vertical sync suppression and horizontal and vertical sync suppression.

In addition, the illustrated preferred method embodiment aligned corresponding video components in time coincidence for simultaneous decryption at subscriber sites but other embodiments of the invention may synchronize (i.e., place in a predetermined time sequence) corresponding video components for synchronous decryption at subscriber sites.

Figure 7:
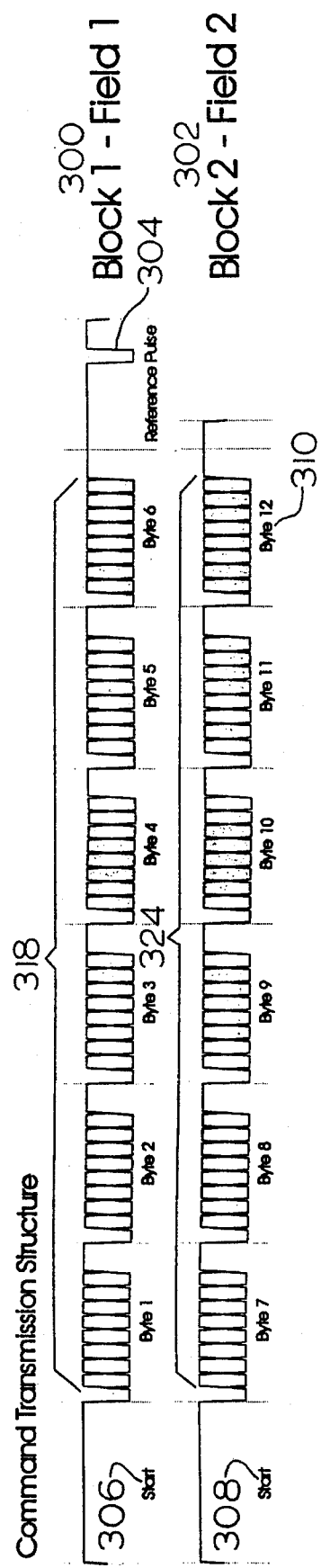
FIG. 7 illustrates the command transmission structure comprised of multiple data bytes and a reference pulse that are added to a selected television signal.

With reference now to FIG. 7, there is shown a diagram of a preferred command transmission structure of the data that is added to a selected television channel for providing synchronization and the authorization data. The basic structure of the authorization data is preferably comprised of twelve data bytes, divided into two data blocks 300 and 302 of six bytes each, corresponding to the two interlaced fields which form a single video frame and a precisely placed reference pulse 304 used to provide timing information for decrypting the common RF signal 68. Additionally, start sequences 306 and 308 are provided to identify the start of each data block. The data bytes are preferably used to identify authorized individuals or groups of authorized subscribers to the otherwise encrypted service. At least one byte is preferably included as a validity check byte 310 for the authorization data. Additionally, the validity check byte 310 may be used to determine valid receive timing synchronization.

Figure 8:
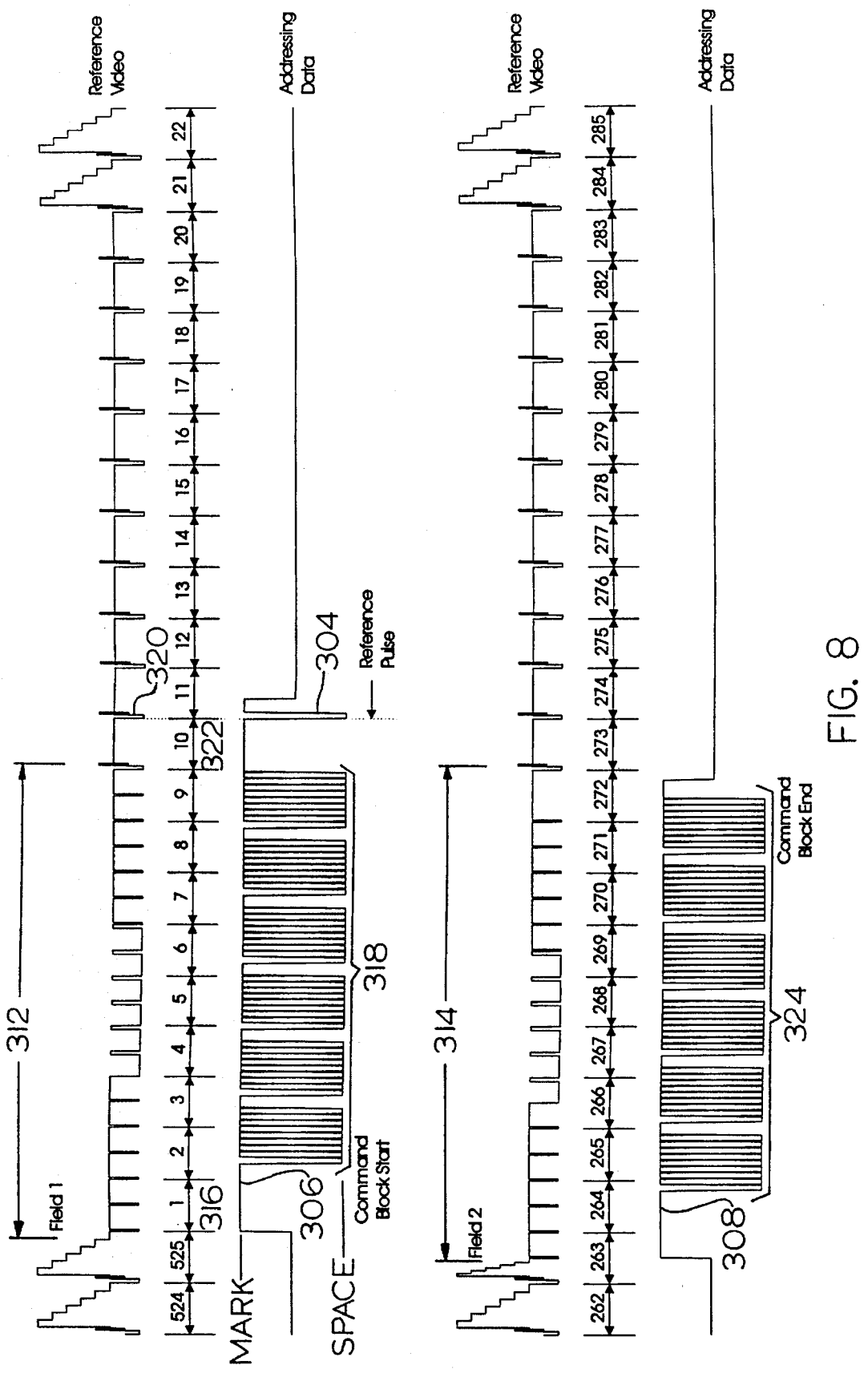
FIG. 8 illustrates the relationship of the command transmission structure of FIG. 7 to a typical 525 lines, 60 HZ television signal.

In a typical 525 line, 60 Hz television signal, as shown in FIG. 8, a video frame is comprised of 525 interlaced horizontal lines of video information, divided into two fields at a 30 Hz frame rate. The beginning of each field is signified by vertical sync components 312 and 314, defining a vertical synchronization interval, that cause a vertical retrace during which the screen is blanked. Video information need not be present during the vertical synchronization interval since the screen is blanked. Thus, as shown in FIG. 8, a preferred embodiment uses the vertical synchronization interval, defined by vertical sync components 312 and 314 and comprised of multiple horizontal lines, to transmit the authorization data without interfering with the displayable video information. Transmission of the first data block 300, comprised of the first start sequence 306, a first set of data bytes 318, six data bytes in a preferred embodiment, and the reference pulse 304, begins with the time period defined by the first horizontal line 316. While the data transmission protocol is otherwise tolerant to timing variations, the reference pulse 304 is precisely synchronized with a horizontal sync pulse 320 that follows the tenth horizontal line 322. The transmission period for the first data block 300 is contained within the time period for horizontal lines 1–10, as shown in FIG. 8. Similarly, the transmission period of the second data block 302, comprised of the second start sequence 308 and a second set of data bytes 324, six data bytes in a preferred embodiment, is contained within horizontal lines 263–272.

Figure 9:
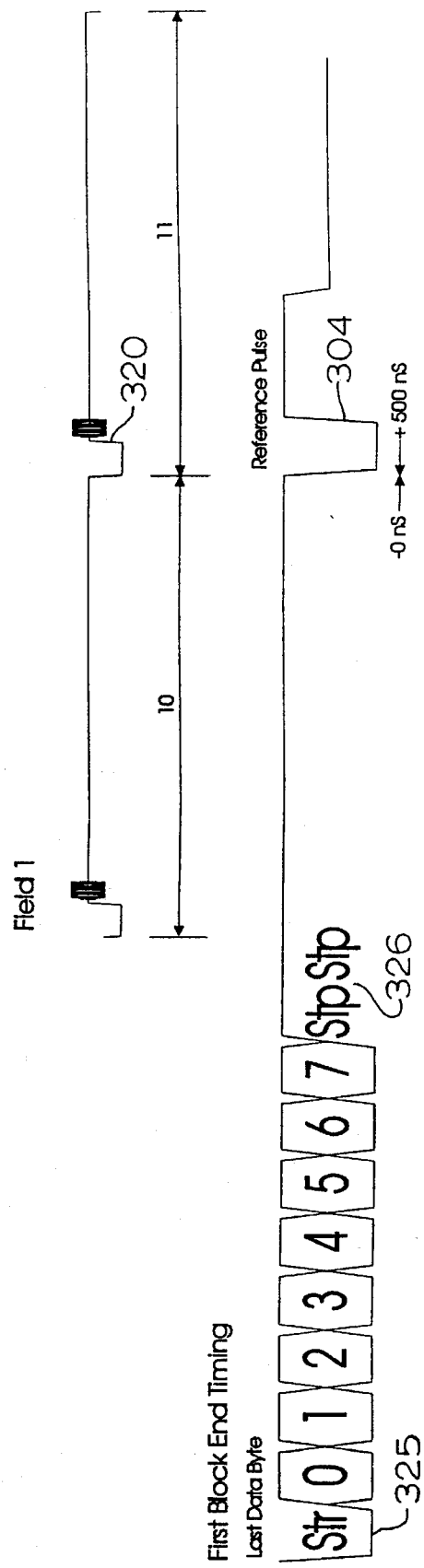
FIG. 9 illustrates the relationship of the reference pulse to the tenth horizontal sync pulse in the television signal of FIG. 8.

Using means discussed below, data is modulated onto a selected television channel during the previously described vertical synchronization interval. As shown in FIGS. 7, 8 and 9, this data is defined as a combination of bits comprised of marks, i.e., and spaces "1"s or "high"s, i.e. "0"s or "low"s. However, outside of these prescribed periods, data values are undefined and potentially susceptible to erroneous detection as marks or spaces. To avoid these errors, the start sequences 306 and 308 are used in combination with the validity check byte 310 to define detection periods corresponding to horizontal lines 1–10 and 263–272. The start sequences 306, 308 are each defined by a series of unique data bits, all "1"s in a preferred embodiment. Each data byte within the first and second sets of data bytes, respectively 318 and 324, are preferably transmitted as 8-bit characters according to a conventional 11-bit asynchronous protocol, as shown in FIG. 9, with one low start bit 325 and two high stop bits 326 per character. As is common with asynchronous character transmission protocols, the time each character is transmitted is not precisely fixed in time. However, a transmission rate is chosen that permits the transmission of an 11-bit start sequence 306, six 11-bit characters 318 and still provide sufficient time to precisely place the reference pulse 304 in synchronization with the horizontal sync pulse 320 following the tenth horizontal line 322. In a preferred embodiment, a bit rate of 140,625 bps is used. While, the reference pulse 304 is described here in reference to a particular video signal, e.g., 220B, it should be recognized that since all of the video signals 220A–220N are synchronized by frame synchronizers 104, the reference pulse 304 will be precisely synchronized to the horizontal sync pulse following the tenth line for all of the video signals.

Figure 10:
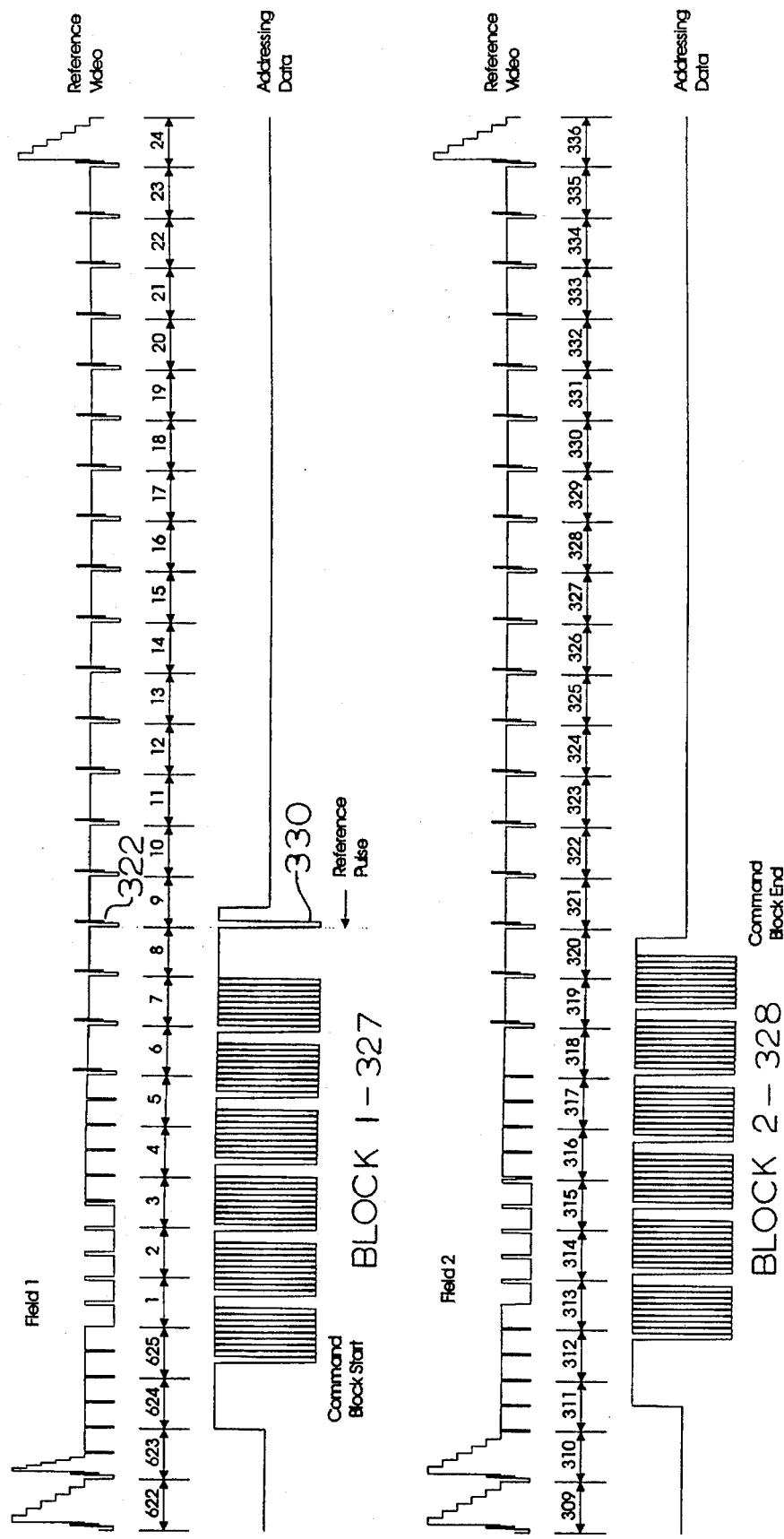
FIG. 10 illustrates the relationship of the command transmission structure of FIG. 7 to a typical 625 lines, 50 Hz television signal.
Figure 11:
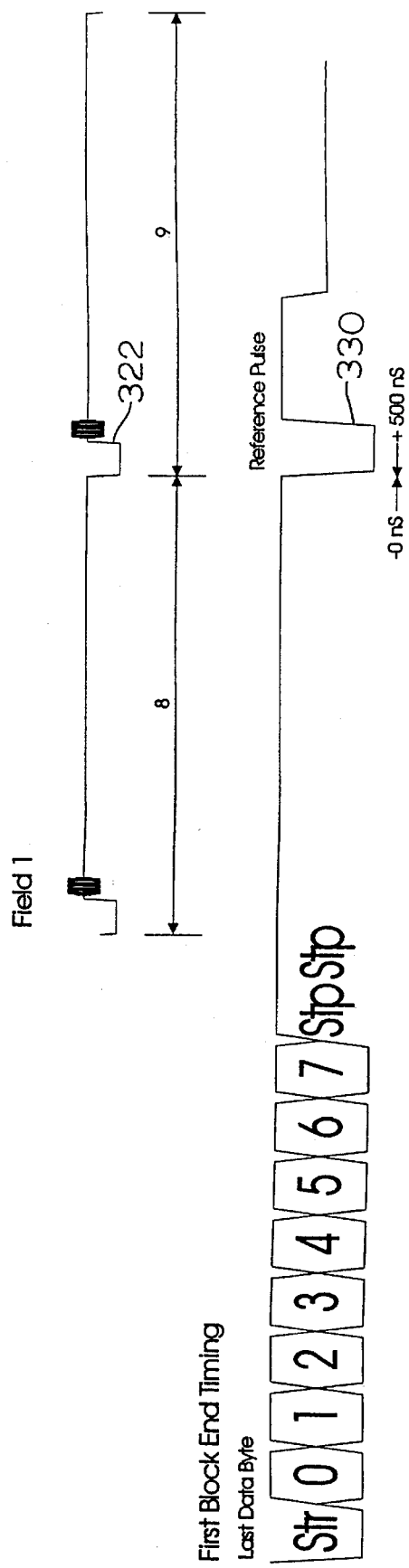
FIG. 11 illustrates the relationship of the reference pulse to the eighth horizontal sync pulse in the television signal of FIG. 10.

With reference to FIGS. 10 and 11, there is shown the interrelationships of the video information and the authorization data for a television signal which uses 625 lines at a 25 Hz frame rate to represent each video frame. In such a television signal, as shown in FIG. 10, a first data block 327 is placed within horizontal lines 624 and 9 and a second data block 328 is placed within horizontal lines 311 and 320. The reference pulse 330 is precisely placed in synchronization with the horizontal sync pulse following the eighth line 332.

In a preferred embodiment, the television channel selected for transmitting the authorization data is fixed, e.g., always set to a predetermined channel N. However, the downconverter/decoder 120 is preferably configured to scan channels within its frequency range to identify the channel containing the authorization data. Alternate embodiments may alter the data channel selection according to a predetermined algorithm, e.g., a different channel for each time period, a first data channel identifies a next data channel, etc. As discussed in reference to FIGS. 3A and 3B, the common timing reference signal 109 can alternatively be coupled to any one or all of a plurality of data modulators 116. A select signal (not shown) can optionally enable a particular data modulator 116 to add the common timing reference signal 109 to a selected channel.

Figure 12:
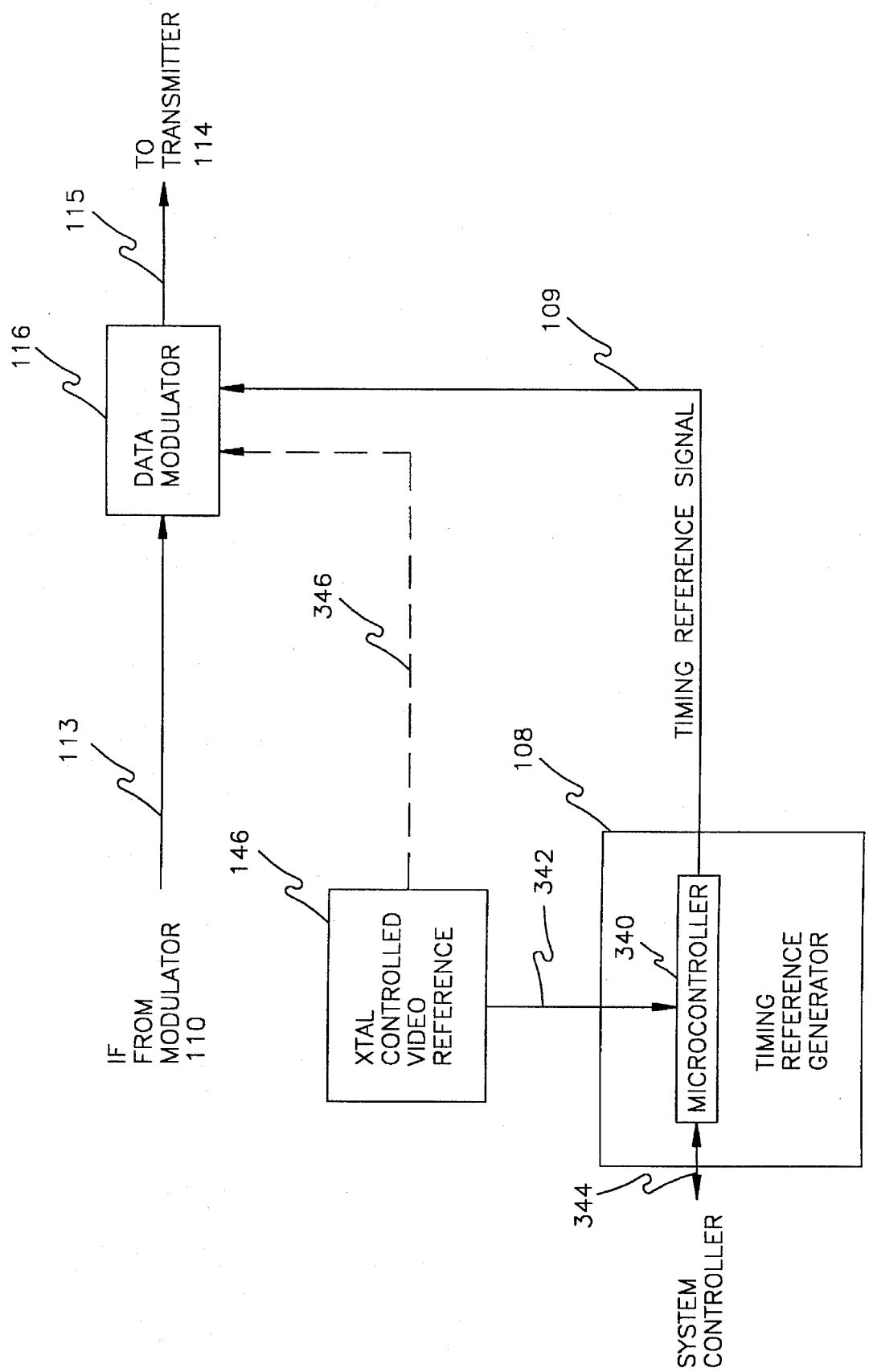
FIG. 12 is an expanded block diagram of a portion of the processing of video channel N as shown in FIG. 3B.

With reference now to FIG. 12, there is shown an expanded block diagram of a portion of the encryption processing of video channel N, as shown in FIG. 3B, showing the interface of the encoder 112N and the IF modulator 110N to the data modulator 116. In a preferred embodiment, the encoder 112N applies a selected encoding rule, e.g., removing the horizontal and vertical synchronizing components 224, 226 from a time synchronized video signal 106N, to disable subscribers without authorized decoders from receiving a video channel. An encrypted video signal 334 is then modulated by the IF modulator 110N, generating the encoded IF carrier 113N. In a preferred embodiment, the encoded IF carrier 113N from the IF modulator 110N is modulated by the data modulator 116 during the time period corresponding to the vertical synchronizing component 226, i.e., the vertical synchronization interval, in response to the common timing reference signal 109 and sent via the data modulated IF carrier 115 to the transmitter 100N. As described above, the data modulator 116 is only present on a selected channel 1-N in a preferred embodiment. In another embodiment, the data modulator 116 may be present for all N channels but may be enabled only for the selected channel or alternatively for a plurality of channels. Alternatively, a single data modulator 116 may be switched to the selected channel.

The timing reference generator 108, under control of a microcontroller 340, generates the common timing reference signal 109 in synchronism with a clock 342 received from the crystal controlled video reference 105. As previously discussed, the common timing reference signal 109 additionally preferably comprises the authorization data for specifying authorized subscribers. Authorization information is maintained in a system controller (not shown) and communicated via signal path 344 to the microcontroller 340 where it is formatted as the authorization data onto the common timing reference signal 109. In a preferred embodiment, the common timing reference signal 109 contains three data states corresponding to no data, a mark and a space, thus causing the data modulator 116 to alter the encrypted IF signal 113 on receipt of a mark or space but leave the encrypted IF signal 113 unaltered when receiving a third, no data, state signal. Alternatively, the crystal controlled video reference 105 delivers a sync signal 346 to the data modulator 116 to enable data modulation only during the vertical synchronization interval.

In a preferred embodiment, the data modulator 116 uses FSK (frequency shift keying) to modulate the encoded IF carrier 113 of a selected MMDS channel with the authorization data and the reference pulse 304 during the vertical synchronization interval. The encoded IF carrier 113, as input to the data modulator 116, is either separate video and separate audio modulated IF carriers, or the combined video and audio modulated carriers. In addition, the data modulator 116 receives the common timing reference signal 109, comprised of the reference pulse 304 and the authorization data comprised of sets of data bytes 318 and 324 used to authorize or deauthorize each subscriber. The outputs of the data modulator 116 are the audio and video carriers, FM modulated with the sets of data bytes 318 and 324 and the reference pulse 304 during the vertical synchronization interval.

The preferred data modulator 116 is characterized by: 1) the difference between the output frequencies of the modulated carriers are the same as their respective input carrier frequencies, 2) the system should not add noise or distortion to the modulated carriers, and 3) the audio and video carriers should match in deviation and phase. Since the audio carrier is typically produced as a beat frequency between the audio and video IF carriers, if the audio and video IF carriers do not match in phase and maintain the frequency difference of the original carriers, an unwanted hum could be produced.

Figure 13:
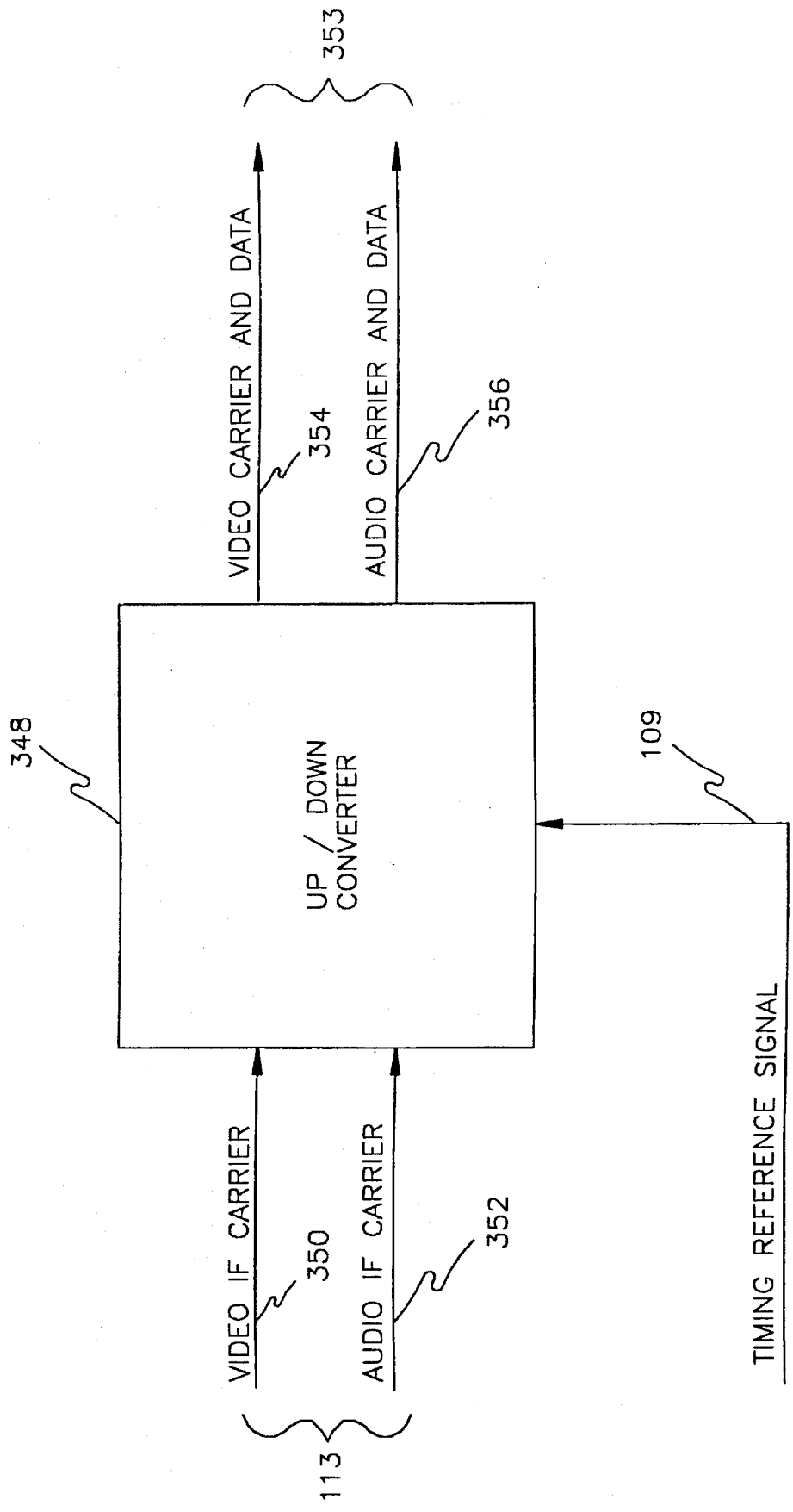
FIG. 13 is a top level block diagram of an up/down converter embodiment of the data modulator of FIGS. 3B and 12.

With reference now to FIG. 13, there is shown a top level block diagram of an up/down converter embodiment 348 of the data modulator 116. In this embodiment, the encoded IF carrier 113 is comprised of a separate video IF carrier 350 and audio IF carrier 352. In an exemplary embodiment, the video IF carrier 350 and the audio IF carrier 352 are typically at 45.75 MHz and 41.25 MHz, respectively, and are nominally separated in frequency by 4.5 MHz. The reference IF carrier 353, generated by the up/down converter 348, is comprised of a separate video carrier+data signal 354 and audio carrier+data signal 356, both of which are uniformly FSK modulated in response to the common timing reference signal 109. In a preferred embodiment, the data responsive frequency deviation for the carriers 350 and 352 is ±25 KHz.

Figure 14:
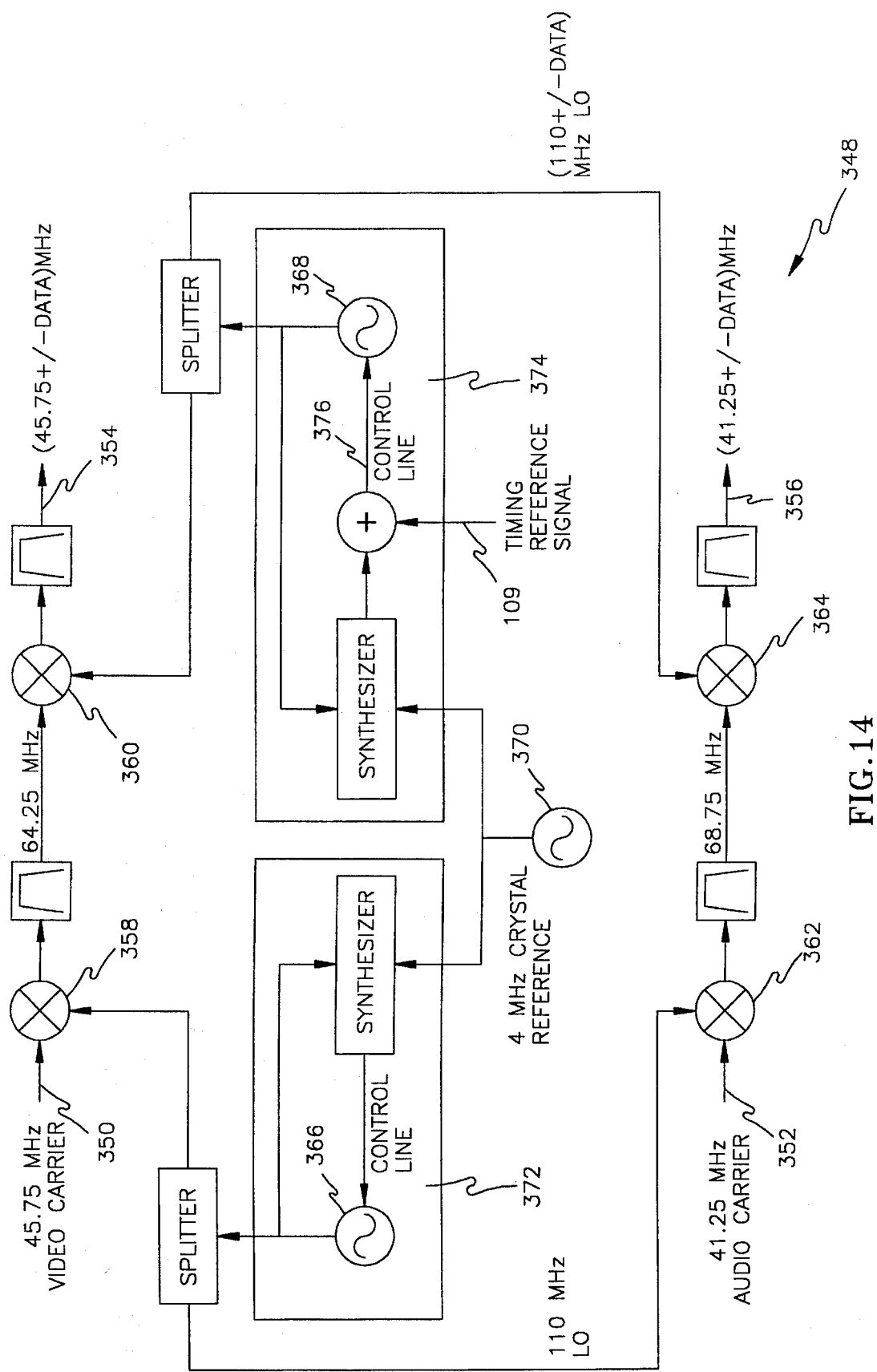
FIG. 14 is a detailed block diagram of a preferred up/down converter as shown in FIG. 13.

In FIG. 14, a detailed block diagram of a preferred up/down converter 348 is shown. The up/down converter 348 consists of a two pairs of mixers 358, 360 and 362, 364, one pair for each carrier, i.e., video 350 and audio 352, under control of a common pair of local oscillators. First and second oscillators 366 and 368 are VCOs (voltage-controlled oscillators) phase locked to a common crystal oscillator 370. The first oscillator 366 functions as a local oscillator (LO) 372 to mix each carrier up to an intermediate frequency and the second oscillator 368 functions as a second local oscillator 374 to mix the signal back down to its original IF frequency. In the process of downconversion, the second local oscillator 374 is frequency modulated with the data from the common timing reference signal 109. Since the second local oscillator 374 changes frequency in response to the common timing reference signal 109, the downconverted carriers 354 and 356 also change frequency and additionally contain FSK data providing synchronization and the authorization data.

The second local oscillator 374 used for the second downconversion is frequency modulated as follows. The phase locked loop of the VCO 368 is used in the second downconversion. The common timing reference signal 109 is summed onto a control line 376 of this VCO 368. Since the modulated VCO 368 is used as the local oscillator 374 for the downconversion, the RF carriers 354 and 356 are also modulated and thus contain the FSK data.

In FIG. 14, the audio and video carriers are separate and thus, this same process is performed in parallel on both the video and audio carriers 350 and 352 using the same two local oscillators 372 and 374. Signals from each oscillator 372, 374 are split and respectively sent to two mixers 358, 362 and 360, 364. The audio carrier 352 is upconverted using the first local oscillator 372 and then downconverted to the original IF frequency using the FM modulated second local oscillator 374. Since the same frequency modulated local oscillator 374 is used in the downconversion of the audio and video carriers, the frequency deviation of both carriers will be essentially identical.

Figure 15:
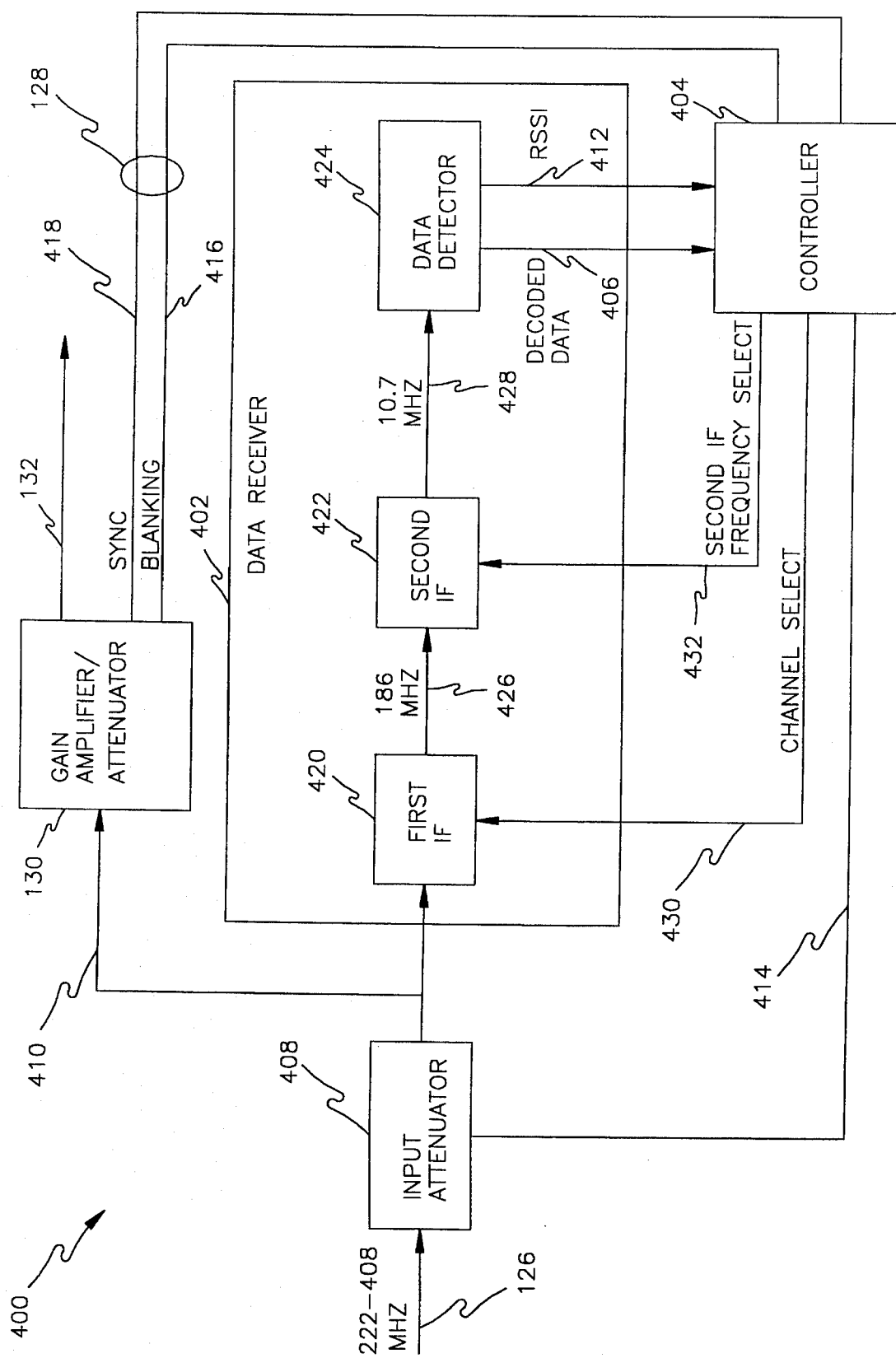
FIG. 15 is a block diagram of a preferred embodiment of the decoder portion of the downconverter/decoder as shown in FIG. 4.

With reference now to FIG. 15, there is shown a preferred embodiment of a decoder portion 400 of the downconverter/decoder 120, as described in reference to FIG. 4. As previously described, the decoder portion 400 receives the downconverted common RF signal 126, recovers the common timing reference signal 109 contained within using the data/timing receiver 127, and in response generates gain control signals 128 to instruct the gain amplifier/attenuator 130 to operate upon the downconverted common RF signal 126 according to the inverse of the selected encoding rule, e.g., reinserting horizontal and vertical components, to generate the decoded channels signal 132. The decoded channels signal 132 can be distributed to one or more standard TV receivers which can independently receive one or more decoded TV channels.

The data/timing receiver 127 is preferably comprised of a superheterodyne dual conversion FSK data receiver 402 under control of a controller 404. The controller 404, receives a decoded data output signal 406 from the data receiver 402 and generates frequency control signals to phase lock the data receiver 402 to the decoded data output signal 406. Additionally, the data/timing/receiver 127 preferably comprises an input attenuator 408 that accepts the downconverted common RF signal 126 and, under control of the controller 404, generates a common attenuated signal 410 to the data receiver 402 and the gain amplifier/attenuator 130. The controller 404 additionally receives a receive signal strength indicator (RSSI) 412 from the data receiver 402 and responsively generates an attenuation control signal 414 to the input attenuator 408. The controller additionally generates gain control signals 128 to the gain amplifier/attenuator 130 are comprised of a blanking control line 416 and a sync control line 418 for reinserting the vertical and horizontal sync signals, respectively, into the common attenuated signal 410 which is derived from the downconverted common RF signal 126.

The data receiver's 402 principal purpose is to retrieve the common timing reference signal 109 from a selected channel within the common attenuated signal 410 and to deliver the common timing reference signal 109 as the decoded data output signal 406, representative of the authorization data and the precisely timed reference pulse 304. The data receiver 402 is comprised of a first IF 420, a second IF 422 and a data detector 424. The first IF 420, receives the common attenuated signal 410, typically having a frequency range of 222 to 408 MHz corresponding to CATV channels 24 to 54, and downconverts the selected channel to a fixed frequency first IF output signal 426. The second IF 422 then further downconverts the first IF output signal 426 to a fixed frequency second IF output signal 428. The second IF output signal 428 is input to the data detector 424 which extracts the decoded data output signal 406 and the receive signal strength indicator 412. The channel selection is determined by the controller 404 by scanning the available channels for data. To scan the available channels, the controller 404 generates a channel select signal 430 to the first IF 420 which determines the amount of frequency downconversion required for the common attenuated signal 410. The channel select signal 430 is iteratively altered until data is successfully received. Additionally, the controller 404 generates a second IF frequency select signal 432 to the second IF 422. In a preferred embodiment, the operating frequencies of the first IF 420 and the second IF 422, as determined by the channel select 430 and second IF frequency select 432 signals are adjusted by the controller 404 in response to the decoded data output signal 406, thus phase locking the data receiver 402 to the data contained within, i.e., the common timing reference signal 109.

Figure 16:
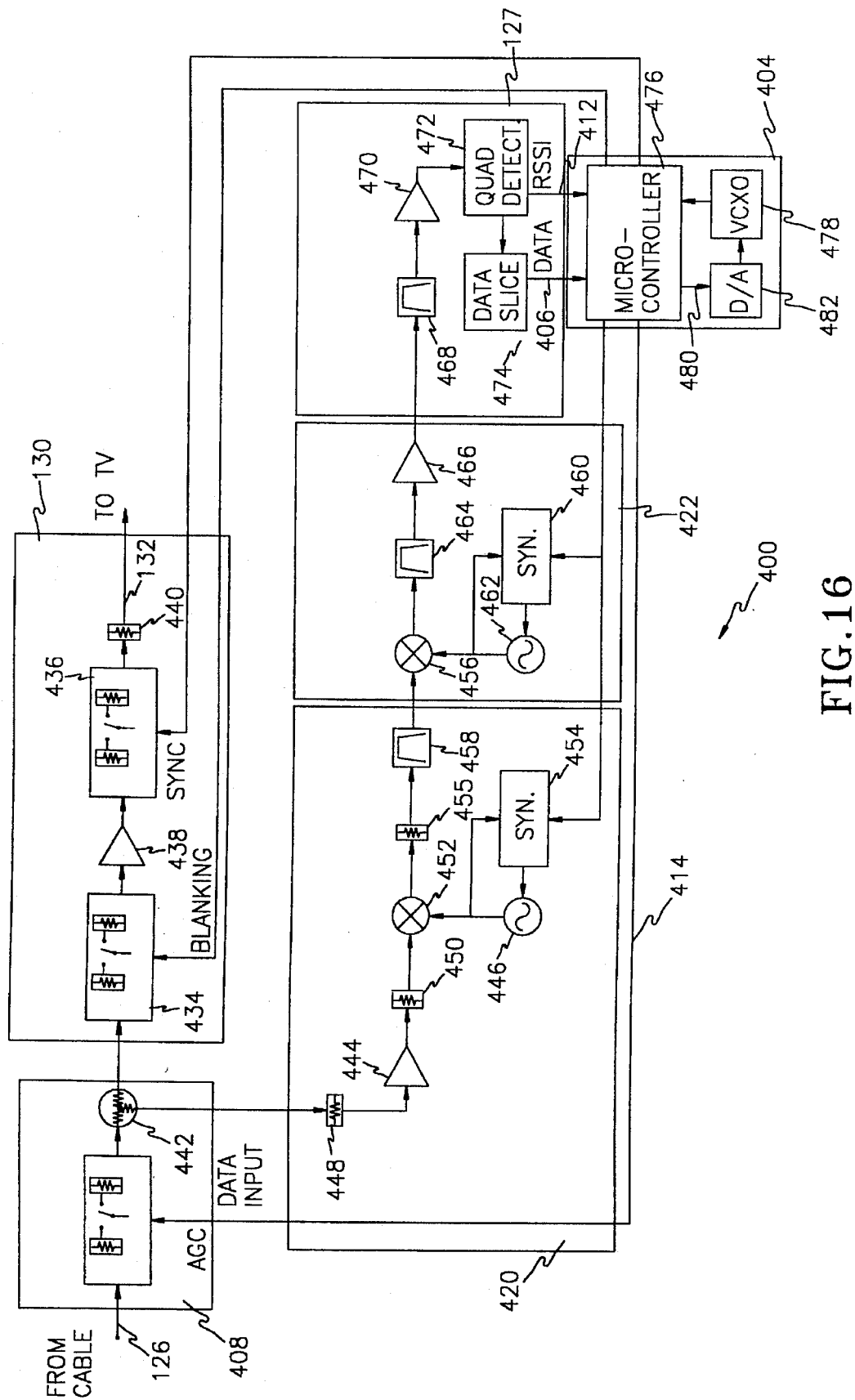
FIG. 16 is a detailed block diagram of an exemplary embodiment of the decoder of FIG. 15.

FIG. 16 shows a detailed block diagram of an exemplary embodiment of the decoder 400 of FIG. 15, comprised of the first IF 420, the second IF 422 and the data detector 424, that sends data to the controller 404 that in turn controls the gain amplifier/attenuator 130, comprised of two switchable RF attenuators, to re-insert sync and blanking signals directly on cable TV frequencies. In a preferred embodiment, video channels contained within the downconverted common RF signal 126 do not contain horizontal or vertical sync pulses. In addition, the horizontal blanking level corresponding to each channel within the common RF signal 68 is preferably attenuated to prevent detection circuitry of some TV receivers from using the blanking signal as a false sync reference. During the vertical synchronization interval, the blanking level is not attenuated by the encryption. The decoder 400 performs the inverse of the selected encoding rule to restore the sync and blank signals to proper levels using a pair of two level RF attenuators, a blanking switch 434 and a sync switch 436. An amplifier 438 isolates the blanking and sync switches 434, 436 to prevent signal interactions. The amplifier 438 is preferably a linear amplifier capable of handling multiple high level carriers with low distortion. A pad 440 helps to isolate the sync switch 436 from poor external impedance matching.

The input attenuator 408 is activated when the downconverted common RF signal 126 reaches a certain level. This prevents distortion of both the gain amplifier/attenuator 130 and the data/timing receiver 127. The receive signal strength indicator 412, generated by the data detector 424, provides information for the controller 404 to determine at what level to switch in the input attenuator 408 via the attenuator control signal 414.

A resistive splitter 442 provides a signal to both the gain amplifier/attenuator 130 and the first IF 420. The resistive splitter 442 also helps to isolate and prevent interaction with the input attenuator 408.

The data receiver front end includes a high isolation amplifier 444 to isolate a first local oscillator 446. A pad 448 at the input of the amplifier 444 prevents distortion of the amplifier 444 from the multiple carriers within the downconverted common RF signal 126. A pad 450 at the output of the amplifier 444 provides an easy broadband match to the input of a first mixer 452 and also prevents distortion. Both attenuators 448 and 450 also help isolate the first local oscillator 446.

The first mixer 452 and the first local oscillator 446 combination provide a programmable local oscillator frequency range. The data carrier can be any of the video carriers in this band. The IF frequency is preferably chosen to avoid mixing of carriers within the frequency range.

A frequency synthesizer 454 keeps the first local oscillator 446 in phase lock while receiving a reference frequency from the controller 404. The frequency synthesizer 454 is preferably capable of tuning the first local oscillator 446 using the channel select signal 430 from the controller 404. In a preferred embodiment, the controller 404 iteratively tunes the first local oscillator 446 until data is successfully received. Alternatively, the controller 404 is preset to a value for tuning the first local oscillator 446. A pad 455 follows the first mixer 452 to prevent overloading a second mixer 456 as well as to provide a good input termination for an image filter 458.

The second IF 422 is chosen to produce and demodulate an IF frequency, e.g., 10.7 MHz, for which ceramic bandpass filters are readily available. A second frequency synthesizer 460, identical to the first frequency synthesizer 454, is used to phase lock a second local oscillator 462. A first ceramic filter 464 follows the second mixer 456 and sets the demodulation bandwidth.

An IF amp 466 follows the first ceramic filter 464 and helps to limit the signal. A second ceramic filter 468 follows the IF amp 466 for additional band shaping. A gain limiter amplifier 470 follows the second ceramic filter 468 for hard limiting. A quadrature detector 472 follows the limiter amplifier 470 and demodulates the FSK data. The input signal preferably deviates ±25 KHz and has a data rate of 140,625 bits per second. Demodulated data from the quadrature detector 472 enters a data slicer 474 where uncertain data edges are cleaned up, made absolute and fed to the controller 404 as the data output signal 406.

In order to perform the inverse of the selected encoding rule, e.g., to insert the sync and blanking signals, at precisely the correct position in time, the controller 404 is phase locked to the time reference provided from the synchronized signals at the headend. This time reference, originally generated from the common timing reference signal 109 at the headend, becomes available to the controller 404 as part of the demodulated data signal 406. In this exemplary embodiment, the controller 404 performs the inverse of the selected encoding rule with a sync and blank generator that locks itself to the edge of a received reference pulse to avoid sync drift. In a preferred embodiment, this locking is accomplished by altering the clock frequency of the controller 404. In FIG. 15, it is shown that the controller 404 is comprised of a processor 476, preferably a microcontroller, executing software at a rate controlled by a voltage controlled crystal oscillator 478. The processor 476 sends a feedback signal 480 to a digital to analog converter 482 which drives the voltage controlled crystal oscillator 478 and effectively changes the clock frequency and thus the execution speed of the processor 476. By responsively altering the execution speed of the processor 476 in response to the decoded data output signal 406, the channel select 430 and the second IF frequency select signals 432 are thus responsively altered, phase locking the data receiver 402 to the decoded data signal 406.

As discussed in reference to the data modulator 116, data is only sent during prescribed periods, the vertical synchronization intervals. The controller 404, under software control, recognizes the reference pulse 304, and a combination of the first start sequence 306, the second start sequence 308 and the validity check byte 310, to ensure that the controller 404 is synchronized with the common timing reference signal 109. When an error is encountered, the controller 404 alters its clock frequency and/or the time window during which it looks for the data blocks 300 and 302.

From the foregoing it should now be recognized that encryption/decryption method and apparatus embodiments have been disclosed herein which make a plurality of distributed television channels simultaneously and automatically available to authorized subscribers. Additionally, a single channel system using the disclosed modulation and demodulation methods is also considered within the scope of the present invention. The preferred embodiments of the invention described herein are exemplary and numerous modifications and rearrangements can be readily envisioned to achieve an equivalent result, all of which are intended to be embraced within the scope of the appended claims.

I claim:

1. A method of distributing multiple video signals, each produced by a different video source at a system headend and each containing picture and synchronization components, to a plurality of subscriber sites located remote from said headend, said method comprising the steps of:

generating at said headend multiple carrier signals;

modulating at said headend each of said carrier signals with a different one of said video signals to form multiple channel signals, all of said channel signals having their respective video signal synchronization components in time coincidence;

generating a common timing reference signal synchronous with said time coincident synchronization components;

causing each of said channel signals to be encrypted at said headend in accordance with a common predetermined encoding rule;

modulating a selected encrypted channel signal in response to said common timing reference signal;

distributing said multiple encrypted channel signals from said headend to said subscriber sites as a common RF signal; and responding at each subscriber site to said common timing reference signal to simultaneously decrypt all of the channel signals distributed thereto by operating upon said common RF signal with a single downconverter/decoder in accordance with the inverse of said encoding rule to recover multiple decrypted channel signals for direct simultaneous application to a conventional television receiver.

2. The method of claim 1, wherein said decrypting step includes the step of synchronizing the decryption of said channel signals with said common timing reference signal.

3. The method of claim 1, wherein said causing step includes the step of simultaneously amplitude modulating said channel signals in accordance with said predetermined encoding rule.

4. The method of claim 3, wherein said decrypting step includes the steps of:

recovering said common timing reference signal; and simultaneously amplitude modulating, synchronous with said common timing reference signal, said channel signals in accordance with the inverse of said encoding rule.

5. The method of claim 1, wherein said causing step includes the step of simultaneously amplitude modulating said channel signals in accordance with said encoding rule.

6. The method of claim 5, wherein said decrypting step includes the steps of:

recovering said common timing reference signal; and simultaneously amplitude modulating, synchronous with said common timing reference signal, said channel signals in accordance with the inverse of said encoding rule.

7. The method of claim 1, further comprising the step of adding authorization data to said common timing reference signal before distributing said common timing reference signal to said subscriber sites.

8. The method of claim 7, wherein said responding step includes extracting said authorization data from said common timing reference signal at each subscriber site and enabling or disabling said decrypting step in response to said authorization data.

9. The method of claim 1, further including modulating a selected channel signal with said common timing reference signal before distributing to said subscriber sites.

10. The method of claim 9, wherein said responding step includes extracting said common timing reference signal from said selected channel signal by demodulating said selected channel signal.

11. The method of claim 9, wherein said modulating step comprises frequency modulation.

12. The method of claim 11, wherein each channel signal is comprised of an audio component at a first carrier frequency and a video component at a second different carrier frequency and said frequency modulation does not alter the difference between said carrier frequencies.

13. Apparatus for distributing multiple video signals, each produced by a different video source at a system headend and each containing picture and synchronization components, to a plurality of subscriber sites located remote from said headend, the apparatus comprising:

means at said headend for generating multiple carrier signals;

means at said headend for modulating each of said carrier signals with a different one of said video signals to form multiple channel signals, all of said channel signals having their respective video signal synchronization components in time coincidence;

means at said headend for generating a common timing reference signal synchronous with said time coincident synchronization components;

means at said headend for causing each of said channels signals to be encrypted in accordance with a common predetermined encoding rule;

means to data modulate a selected encoded channel signal in response to said common timing reference signal;

means at said headend for distributing said multiple encrypted channels signals to said subscriber sites as a common RF signal; and means at each subscriber site responsive to said common timing reference signal for simultaneously decrypting all of said channel signals distributed thereto by operating upon said common RF signal with a single downconverter/decoder in accordance with the inverse of said encoding rule to recover multiple decrypted signals for direct simultaneous application to a conventional television receiver.

14. The apparatus of claim 13, wherein said means for decrypting includes means for synchronizing the decryption of said channel signals with said common timing reference signal.

15. The apparatus of claim 13, wherein means for causing includes means for simultaneously amplitude modulating said channel signals in accordance with said predetermined encoding rule.

16. The apparatus of claim 15, wherein said means for decrypting includes:

means for recovering said common timing reference signal; and means for simultaneously amplitude modulating, synchronous with said common timing reference signal, said channel signals in accordance with the inverse of said encoding rule.

17. The apparatus of claim 13, wherein said means for causing includes means for simultaneously amplitude modulating said channel signals in accordance with said encoding rule.

18. The apparatus of claim 17, wherein said means for decrypting includes:

means for recovering said common timing reference signal; and means for simultaneously amplitude modulating, synchronous with said common timing reference signal, said channel signals in accordance with the inverse of said encoding rule.

19. The apparatus of claim 13, further comprising means for adding authorization data to said common timing reference signal before distributing said common timing reference signal to said subscriber sites.

20. The apparatus of claim 19, further comprising means for extracting said authorization data from said common timing reference signal at each subscriber site to enable or disable said decrypting means in response to said authorization data.

21. The apparatus of claim 13, further comprising means to modulate a selected channel signal with said common timing reference signal before distributing to said subscriber sites.

22. The apparatus of claim 21, wherein said decrypting means includes means to extract said common timing reference signal from said selected channel signal by demodulating said selected channel signal.

23. The apparatus of claim 21, wherein said modulation means modifies said selected channel signal using frequency modulation.

24. The method of claim 23, wherein each channel signal is comprised of an audio component at a first carrier frequency and a video component at a second different carrier frequency and said frequency modulation means does not alter the difference between said carrier frequencies.

25. Apparatus for distributing multiple video signals, each produced by a different video source at a system headend and each containing picture and synchronization components, to a plurality of subscriber sites located remote from said headend, the apparatus comprising:

a video reference clock for generating a synchronizing signal;

a plurality of frame synchronizers responsive to said synchronizing signal and said video signals for generating a plurality of time synchronized video signals;

a plurality of IF modulators responsive to said time synchronized video signals for generating a plurality of modulated video signals;

a plurality of encoders responsive to said synchronizing signal for removing said synchronization components from said modulated video signals to generate a plurality of encoded video signals;

means to data modulate a selected encoded video signal in response to said synchronizing signal; and means to distribute said encoded video signals to a plurality of subscriber sites; and means at each subscriber site to simultaneously decode each of said encoded video signals by reinserting said synchronization components in response to said selected modulated video signal.

26. The apparatus of claim 25, wherein said data modulation means is additionally responsive to authorization data.

27. The apparatus of claim 26, wherein said decoding means is enabled or disabled in response to said authorization data.

28. The apparatus of claim 25, wherein said modulating means uses frequency modulation.

29. The apparatus of claim 28, wherein each modulated video signal is comprised of an audio component at a first carrier frequency and a video component at a second different carrier frequency and said frequency modulation does not alter the difference between said carrier frequencies.

30. The apparatus of claim 25, wherein said decoding means comprises:

receiving means to extract said synchronization signal from said selected modulated video signal; and means to phase lock said receiving means to said extracted synchronization signal.

31. The apparatus of claim 30, wherein said phase locking means comprises:

an oscillator generating a clock frequency in responsive to a control signal; and a processor, executing software to control said receiving means, at a rate responsive to said clock frequency; said processor additionally being responsive to said extracted synchronization signal by altering said control signal.

32. Apparatus for distributing multiple video signals, each produced by a different video source at a system headend and each containing picture and synchronization components, to a plurality of subscriber sites located remote from said headend, the apparatus comprising:

a video reference clock for generating a synchronizing signal;

a plurality of frame synchronizers responsive to said synchronizing signal and said video signals for generating a plurality of time synchronized video signals;

a plurality of encoders responsive to said synchronizing signal for removing said synchronization components from said video signals to generate a plurality of encoded video signals;

a plurality of IF modulators responsive to said time synchronized video signals for generating a plurality of modulated encoded video signals;

means to data modulate a selected encoded video signal in response to said synchronizing signal; and means to distribute said encoded video signals to a plurality of subscriber sites; and means at each subscriber site to simultaneously decode each of said encoded video signals by reinserting said synchronization components in response to said selected modulated video signal.

* * * * *